(12) United States Patent
Liao et al.

(10) Patent No.: US 9,733,455 B1
(45) Date of Patent: Aug. 15, 2017

(54) OPTICAL IMAGE LENS ASSEMBLY, IMAGE CAPTURING DEVICE AND ELECTRONIC DEVICE

(71) Applicant: LARGAN PRECISION CO., LTD., Taichung (TW)

(72) Inventors: Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/168,219

(22) Filed: May 30, 2016

(30) Foreign Application Priority Data

Mar. 31, 2016 (TW) .............................. 105110322 A

(51) Int. Cl.
*G02B 9/64* (2006.01)
*G02B 13/00* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 27/0025; G02B 9/64; G02B 9/62
See application file for complete search history.

(56) References Cited

U.S. PATENT DOCUMENTS

| 2014/0247507 A1* | 9/2014 | Tsai ......................... G02B 9/62 359/713 |
|---|---|---|
| 2014/0368931 A1 | 12/2014 | Noda et al. |
| 2015/0241671 A1 | 8/2015 | Chang |
| 2015/0338613 A1 | 11/2015 | Tang et al. |
| 2015/0338614 A1 | 11/2015 | Tang et al. |
| 2015/0362702 A1 | 12/2015 | Tang et al. |
| 2016/0341935 A1 | 11/2016 | Chen et al. |

FOREIGN PATENT DOCUMENTS

| CN | 105024144 A | 12/2015 |
|---|---|---|
| CN | 105204144 A | 12/2015 |

* cited by examiner

*Primary Examiner* — Joseph P Martinez
(74) *Attorney, Agent, or Firm* — McClure, Qualey & Rodack, LLP

(57) ABSTRACT

An optical image lens assembly includes, in order from an object side to an image side, a first lens element, a second lens element, a third lens element, a fourth lens element, a fifth lens element and a sixth lens element. The first lens element with negative refractive power has an image-side surface being concave. The second lens element has an object-side surface being convex. The third lens element has positive refractive power. The fourth lens element with negative refractive power has an image-side surface being concave. The fifth lens element with positive refractive power has an image-side surface being convex. The sixth lens element with negative refractive power has an object-side surface being concave and an image-side surface being concave and the image-side surface of the sixth lens element includes at least one convex shape in an off-axial region thereof.

24 Claims, 18 Drawing Sheets

OPTICAL IMAGE LENS ASSEMBLY, IMAGE CAPTURING DEVICE AND ELECTRONIC DEVICE

RELATED APPLICATIONS

This application claims priority to Taiwan Application Serial Number 105110322, filed Mar. 31, 2016, which is herein incorporated by reference.

BACKGROUND

Technical Field

The present disclosure relates to an optical image lens assembly and an image capturing device. More particularly, the present disclosure relates to an optical image lens assembly and an image capturing device with a compact size applicable to electronic devices.

Description of Related Art

In recent years, with the development of compact electronic devices, corresponding image capturing devices installed are also required to be miniaturized. However, the conventional optical image lens assembly provides a large field of view with the greater total track length or back focal length, even the excessive size, so that the demand of a compact size cannot be satisfied, and it is also hard to utilize a recent trend of image sensors (which have higher sensitivity, and can match with optical image lens assemblies with shorter back focal length etc.).

SUMMARY

According to one aspect of the present disclosure, an optical image lens assembly includes, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has an object-side surface being convex in a paraxial region thereof. The third lens element has positive refractive power. The fourth lens element with negative refractive power has an image-side surface being concave in a paraxial region thereof. The fifth lens element with positive refractive power has an image-side surface being convex in a paraxial region thereof. The sixth lens element with negative refractive power has an object-side surface being concave in a paraxial region thereof and an image-side surface being concave in a paraxial region thereof, wherein the object-side surface and the image-side surface of the sixth lens element are aspheric, and the image-side surface of the sixth lens element comprises at least one convex shape in an off-axial region thereof. The optical image lens assembly has a total of six lens elements, there is an air space between every two lens elements of the first lens element, the second lens element, the third lens element, the fourth lens element, the fifth lens element and the sixth lens element that are adjacent to each other. When an axial distance between the first lens element and the second lens element is T12, an axial distance between the second lens element and the third lens element is T23, a curvature radius of the object-side surface of the sixth lens element is R11, and a curvature radius of the image-side surface of the sixth lens element is R12, the following conditions are satisfied:

$1.0 < T12/T23 < 15$; and $|(R11+R12)/(R11-R12)| < 0.90$.

According to another aspect of the present disclosure, an image capturing device includes the optical image lens assembly of the aforementioned aspect and an image sensor, wherein the image sensor is disposed on an image surface of the optical image lens assembly.

According to yet another aspect of the present disclosure, an electronic device includes the image capturing device of the aforementioned aspect.

According to further another aspect of the present disclosure, an optical image lens assembly comprising, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has an object-side surface being convex in a paraxial region thereof. The third lens element has positive refractive power. The fourth lens element with negative refractive power has an image-side surface being concave in a paraxial region thereof. The fifth lens element with positive refractive power has an image-side surface being convex in a paraxial region thereof. The sixth lens element with negative refractive power has an object-side surface being concave in a paraxial region thereof and an image-side surface being concave in a paraxial region thereof, wherein the object-side surface and the image-side surface of the sixth lens element are aspheric, and the image-side surface of the sixth lens element comprises at least one convex shape in an off-axial region thereof. The optical image lens assembly has a total of six lens elements, there is an air space between every two lens elements of the first lens element, the second lens element, the third lens element, the fourth lens element, the fifth lens element and the sixth lens element that are adjacent to each other. When an axial distance between the first lens element and the second lens element is T12, an axial distance between the second lens element and the third lens element is T23, a curvature radius of the object-side surface of the sixth lens element is R11, and a curvature radius of the image-side surface of the sixth lens element is R12, the following conditions are satisfied:

$0 < T12/T23 < 15$; and $|(R11+R12)/(R11-R12)| < 0.80$.

DETAILED DESCRIPTION

Figure 1:
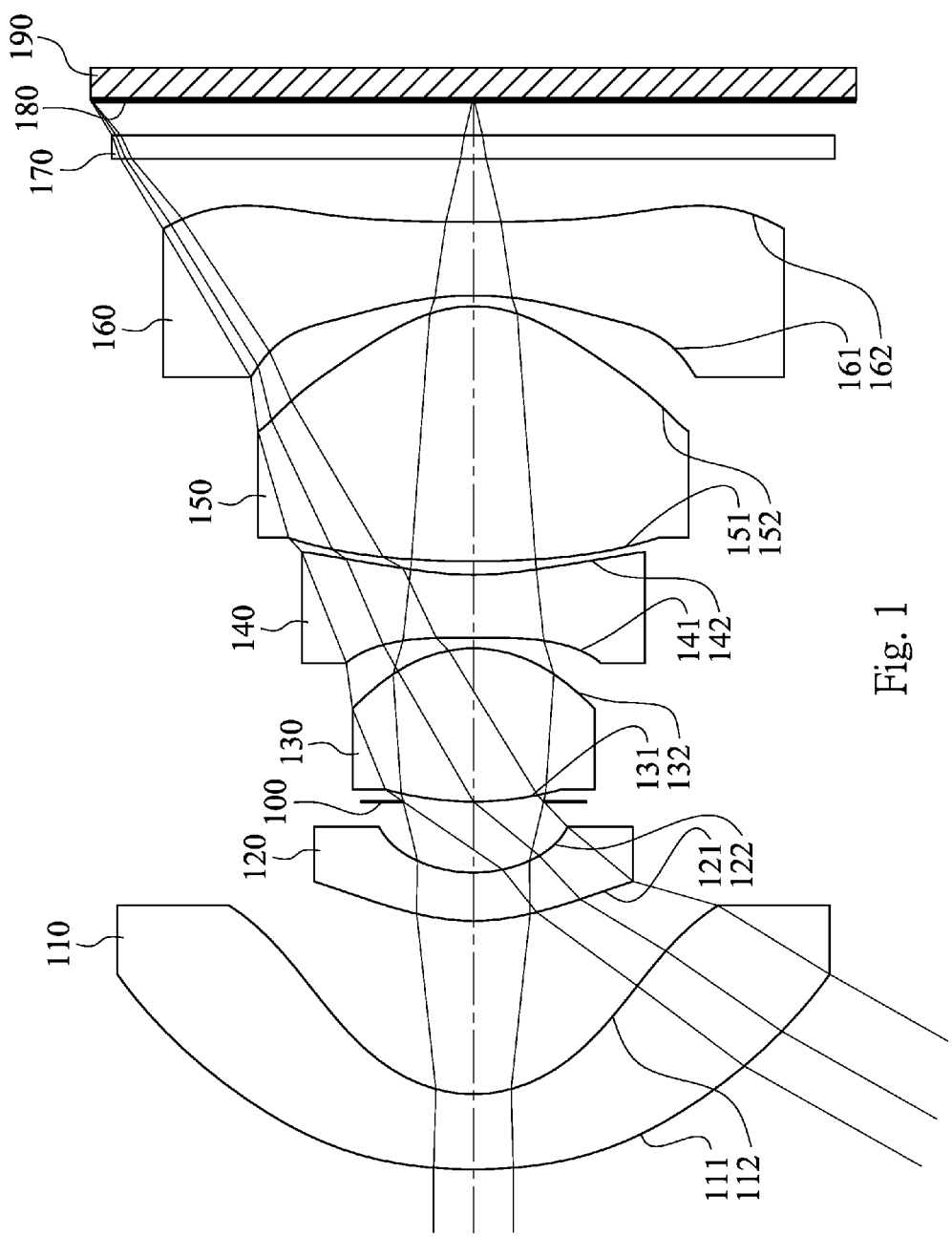
FIG. 1 is a schematic view of an image capturing device according to the 1st embodiment of the present disclosure.

An optical image lens assembly includes, in order from an object side to an image side, a first lens element, a second lens element, a third lens element, a fourth lens element, a fifth lens element and a sixth lens element, wherein the optical image lens assembly has a total of six lens elements. The optical image lens assembly can further include an aperture stop disposed between an imaged object and the third lens element.

According to the optical image lens assembly of the present disclosure, there is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element and the sixth lens element of the optical image lens assembly, there is a space in a paraxial region between every pair of lens elements that are adjacent to each other. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the optical image lens assembly. Therefore, according to the imaging lens system of the present disclosure, having an air space in a paraxial region between every two of the first lens element, the second lens element, the third lens element, the fourth lens element, the fifth lens element and the sixth lens element that are adjacent to each other of the present disclosure avoids the problem generated by the cemented lens elements.

The first lens element with negative refractive power has an image-side surface being concave in a paraxial region thereof. Therefore, it is favorable for allowing the incident light from larger field of view traveling into the optical image lens assembly.

The second lens element has an object-side surface being convex in a paraxial region thereof and can have an image-side surface being concave in a paraxial region thereof. Therefore, it is favorable for correcting the spherical aberration of the optical image lens assembly.

The third lens element has positive refractive power, so that the refractive power of the optical image lens assembly can be well distributed, and the sensitivity of the optical image lens assembly can be reduced.

The fourth lens element with negative refractive power has an image-side surface being concave in a paraxial region thereof. Therefore, the incident light can be further converged so as to provide the wider field of view and reduce the total track length. Furthermore, the image-side surface of the fourth lens element can include at least one convex shape in an off-axial region thereof, so that it is favorable for correcting aberrations in the off-axial region.

The fifth lens element with positive refractive power has an image-side surface being convex in a paraxial region thereof. Therefore, it is favorable for converging the incident light and further reducing the total track length by providing the main positive refractive power of the optical image lens assembly.

The sixth lens element with negative refractive power has an object-side surface being concave in a paraxial region thereof and an image-side surface being concave in a paraxial region thereof, wherein the image-side surface of the sixth lens element includes at least one convex shape in an off-axial region thereof. Therefore, the indent light can be effectively focused on the image surface by the distribution of the refractive power of the third lens element, the fourth lens element, the fifth lens element and the sixth lens element, and the principal point can be positioned closer to the object side by the shapes in the paraxial region of the object-side surface and the image-side surface so as to reduce the back focal length and shorten the total track length. Further, it is favorable for enhancing the light gathering and the resolution in the peripheral region of the image by the shape variation of the image-side surface of the sixth lens element from the paraxial region to the off-axial region.

When an axial distance between the first lens element and the second lens element is T12, and an axial distance between the second lens element and the third lens element is T23, the following condition is satisfied: $0<T12/T23<15$. Therefore, it is favorable for providing the sufficient space so as to obtain the proper shape of the second lens element which is thinner and has the weaker refractive power, so that the advantages of proper molding, aberrations correction or illumination enhancement in the off-axial region can be obtained. Preferably, the following condition can be satisfied: $1.0<T12/T23<15$. More preferably, the following condition can be satisfied: $1.50<T12/T23<7.50$.

When a curvature radius of the object-side surface of the sixth lens element is R11, and a curvature radius of the image-side surface of the sixth lens element is R12, the following conditions are satisfied: $|(R11+R12)/(R11-R12)|<0.90$. Therefore, it is favorable for avoiding the insufficient refractive power by preventing such flat single surface of the sixth lens element so as to maintain the ability for reducing the back focal length. Preferably, the following condition can be satisfied: $|(R11+R12)/(R11-R12)|<0.80$. More preferably, the following condition can be satisfied: $|(R11+R12)/(R11-R12)|<0.60$.

When a central thickness of the fifth lens element is CT5, and an axial distance between the fifth lens element and the sixth lens element is T56, the following condition is satisfied: $0<CT5/T56<7.50$. Therefore, it is favorable for properly arranging the fifth lens element and the sixth lens element, so that the difficulties in properly utilizing the space and assembling can be solved by avoiding the excessive close arrangement of the lens elements. Preferably, the following condition can be satisfied: $0.50<CT5/T56<3.75$. More preferably, the following condition can be satisfied: $0.70<CT5/T56<3.75$.

When a maximum image height of the optical image lens assembly is ImgH, and an axial distance between the image-side surface of the sixth lens element and the image surface is BL, the following condition is satisfied: $2.40<ImgH/BL<4.50$. Therefore, it is favorable for reducing the back focal length so as to reduce the total track length and the size of the optical image lens assembly and ensure the sufficient illumination in the off-axial region of the image.

When a curvature radius of an object-side surface of the fifth lens element is R9, and a curvature radius of the image-side surface of the fifth lens element is R10, the following condition is satisfied: $0<(R9+R10)/(R9-R10)<10$. Therefore, it is favorable for moderating the shape variation of the fifth lens element, and improving the lens molding and the illumination in the off-axial region of the image.

When a maximum effective radius of an object-side surface of the first lens element is SD11, and the maximum image height of the optical image lens assembly is ImgH, the following condition is satisfied: $0.50<SD11/ImgH<1.25$. Therefore, it is favorable for reducing the difference among the effective radius of each lens element so as to obtain the proper shape (which have smaller opening in the object side, and larger opening in the image side) applied to the compact image capturing device and further reduce the size thereof.

When a central thickness of the first lens element is CT1, and a central thickness of the second lens element is CT2, the following condition is satisfied: $0.75<CT1/CT2<5.0$. Therefore, it is favorable for strengthening the structure by avoiding the insufficient thickness of the first lens element, so that the split of the lens elements due to the collision can be avoided effectively.

When an Abbe number of the fourth lens element is V4, an Abbe number of the fifth lens element is V5, and an Abbe number of the sixth lens element is V6, the following condition is satisfied: $0.50<(V4+V6)/V5<1.20$. Therefore, it is favorable for obtaining the balance among aberrations (such as the chromatic aberration, the astigmatic etc.) so as to provide the proper sizes of the fourth lens element, the fifth lens element and the sixth lens element.

When the axial distance between the first lens element and the second lens element is T12, the axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following condition is satisfied: $1.0<(T12+T56)/(T23+T34+T45)<4.50$. Therefore, it is favorable for efficiently utilizing the space by closely arranging the second lens element, the third lens element, the fourth lens element and the fifth lens element.

When the maximum image height of the optical image lens assembly is ImgH, and a focal length of the optical image lens assembly is f, the following condition is satisfied: $1.30<ImgH/f<3.0$. Therefore, it is favorable for controlling the focal length of the optical image lens assembly so as to obtain the balance between the large field of view and the compact size.

When a focal length of the third lens element is f3, and a focal length of the fifth lens element is f5, the following condition is satisfied: $0.75<f3/f5<1.5$. Therefore, it is favorable for avoiding the excessive sensitivity of single lens element by evenly distributing the main positive refractive power so as to increase the yield rate.

When a curvature radius of the object-side surface of the fourth lens element is R7, and a curvature radius of the image-side surface of the fourth lens element is R8, the following condition is satisfied: $0<(R7+R8)/(R7-R8)<5.5$. Therefore, it is favorable for correcting the astigmatism so as to enhance the image quality.

When a focal length of the first lens element is f1, and a focal length of the sixth lens element is f6, the following condition is satisfied: $0.40<f1/f6<1.25$. Therefore, aberrations can be corrected and the sensitivity can be reduced due to the even distribution of the negative refractive power of the optical image lens assembly.

According to the optical image lens assembly of the present disclosure, the lens elements thereof can be made of glass or plastic materials. When the lens elements are made of glass materials, the distribution of the refractive power of the optical image lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical image lens assembly. Therefore, the total track length of the optical image lens assembly can also be reduced.

According to the optical image lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the optical image lens assembly of the present disclosure, the refractive power or the focal length of a lens element being positive or negative may refer to the refractive power or the focal length in a paraxial region of the lens element.

According to the optical image lens assembly of the present disclosure, the optical image lens assembly can include at least one stop, such as an aperture stop, a glare stop or a field stop. Said glare stop or said field stop is for eliminating the stray light and thereby improving the image resolution thereof.

According to the optical image lens assembly of the present disclosure, the image surface of the optical image lens assembly, based on the corresponding image sensor, can be flat or curved. In particular, the image surface can be a curved surface being concave facing towards the object side.

According to the optical image lens assembly of the present disclosure, an aperture stop can be configured as a middle stop. A middle stop disposed between the first lens element and the image surface is favorable for enlarging the field of view of the optical image lens assembly and thereby provides a wider field of view for the same.

According to the optical image lens assembly of the present disclosure, the optical image lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned optical image lens assembly and an image sensor, wherein the image sensor is disposed on the image side of the aforementioned optical image lens assembly, that is, the image sensor can be disposed on or near the image surface of the aforementioned optical image lens assembly. By the arrangement of the aforementioned optical image lens assembly including the first lens element with negative refractive power, it is favorable for allowing the incident light from larger field of view traveling into the optical image lens assembly. Further, the light can be gathered on the image surface by the third lens element with positive refractive power, the fourth lens element with negative refractive power, the fifth lens element with positive refractive power and the sixth lens element with negative refractive power, and the principal point can be positioned closer to the object side by the concave shape in the paraxial region of both of the object-side surface and the image-side surface of the sixth lens element so as to reduce the back focal length and obtain the compact size. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-10th specific embodiments are provided for further explanation.

1st Embodiment

Figure 2:
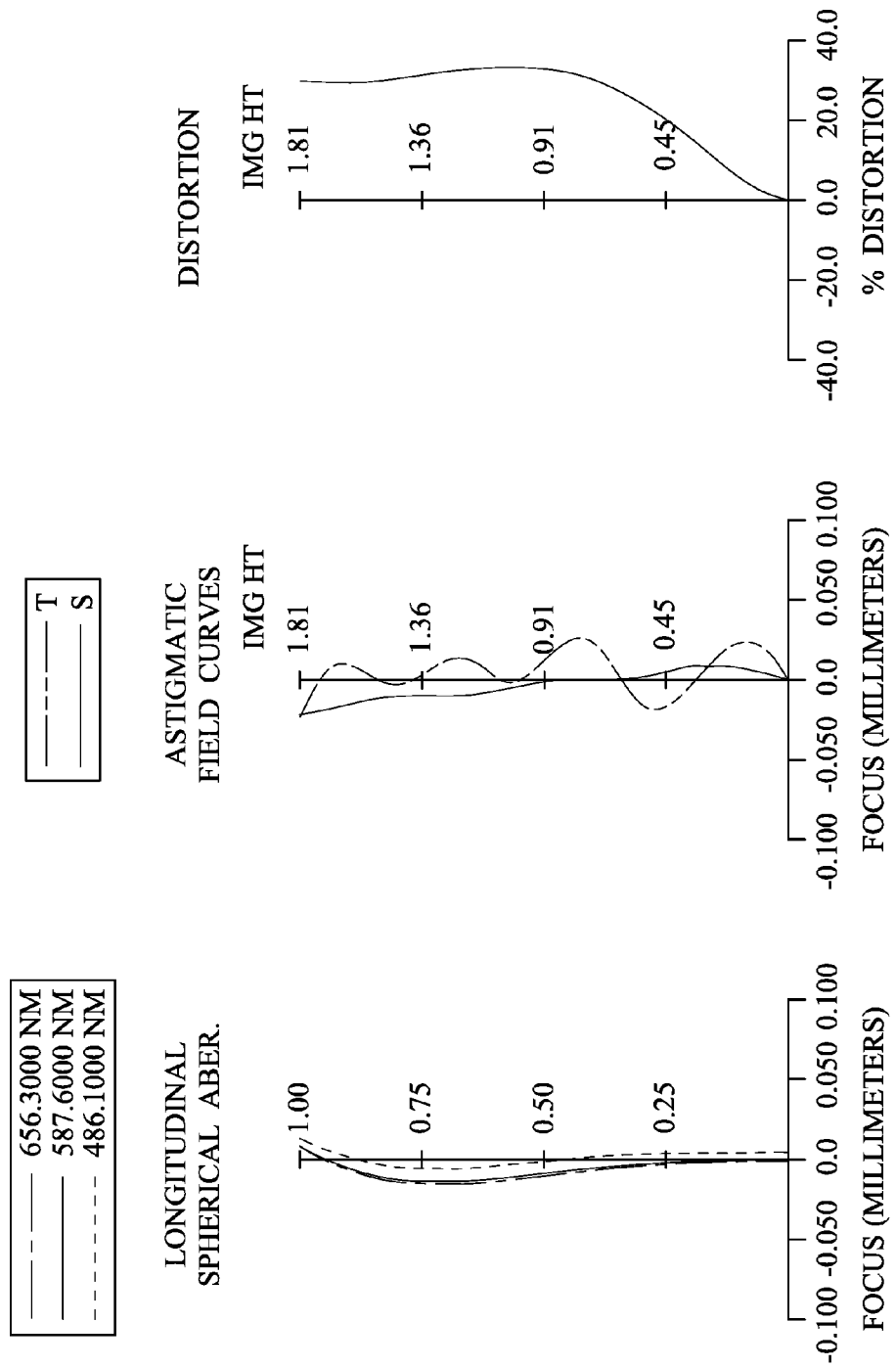
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical image lens assembly (its reference numeral is omitted) and an image sensor 190. The optical image lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the image sensor 190 is disposed on the image surface 180 of the optical image lens assembly. The optical image lens assembly has a total of six lens elements (110-160), and there is an air space between every two lens elements of the first lens element 110, the second lens element 120, the third lens element 130, the fourth lens element 140, the fifth lens element 150 and the sixth lens element 160 that are adjacent to each other.

The first lens element 110 with negative refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axial region thereof.

The IR-cut filter 170 is made of a glass material and located between the sixth lens element 160 and the image surface 180, and will not affect the focal length of the optical image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image lens assembly according to the 1st embodiment, when a focal length of the optical image lens assembly is f, an f-number of the optical image lens assembly is Fno, and half of a maximum field of view of the optical image lens assembly is HFOV, these parameters have the following values: f=0.79 mm; Fno=2.10; and HFOV=60.5 degrees.

In the optical image lens assembly according to the 1st embodiment, when an Abbe number of the fourth lens element 140 is V4, an Abbe number of the fifth lens element 150 is V5, and an Abbe number of the sixth lens element 160 is V6, the following condition is satisfied: (V4+V6)/V5=0.73.

In the optical image lens assembly according to the 1st embodiment, when a central thickness of the first lens element 110 is CT1, and a central thickness of the second lens element 120 is CT2, the following condition is satisfied: CT1/CT2=1.55.

In the optical image lens assembly according to the 1st embodiment, when an axial distance between the first lens element 110 and the second lens element 120 is T12, and an axial distance between the second lens element 120 and the third lens element 130 is T23, the following condition is satisfied: T12/T23=2.44.

In the optical image lens assembly according to the 1st embodiment, when the axial distance between the first lens element 110 and the second lens element 120 is T12, the axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: (T12+T56)/(T23+T34+T45)=1.93.

In the optical image lens assembly according to the 1st embodiment, when a central thickness of the fifth lens element 150 is CT5, and the axial distance between the fifth lens element 150 and the sixth lens element 160 is T56, the following condition is satisfied: CT5/T56=24.26.

In the optical image lens assembly according to the 1st embodiment, when a maximum image height of the optical image lens assembly is ImgH (half of a diagonal length of an effective photosensitive area of the image sensor 190), and an axial distance between the image-side surface 162 of the sixth lens element 160 and the image surface 180 is BL, the following condition is satisfied: ImgH/BL=3.13.

In the optical image lens assembly according to the 1st embodiment, when the maximum image height of the optical image lens assembly is ImgH, and the focal length of the optical image lens assembly is f, the following condition is satisfied: ImgH/f=2.29.

Figure 15:
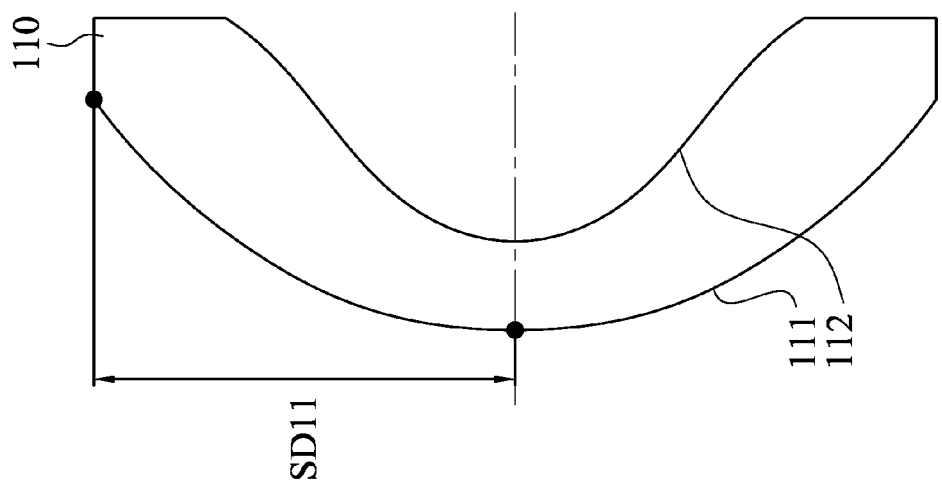
FIG. 15 shows a schematic view of a parameter SD11 according to the 1st embodiment of FIG. 1.

FIG. 15 shows a schematic view of a parameter SD11 according to the 1st embodiment of FIG. 1. In FIG. 15, when a maximum effective radius of the object-side surface 111 of the first lens element 110 is SD11, and the maximum image height of the optical image lens assembly is ImgH, the following condition is satisfied: SD11/ImgH=0.93.

In the optical image lens assembly according to the 1st embodiment, when a curvature radius of the object-side surface 141 of the fourth lens element 140 is R7, and a curvature radius of the image-side surface 142 of the fourth lens element 140 is R8, the following condition is satisfied: (R7+R8)/(R7−R8)=1.26.

In the optical image lens assembly according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9−R10)=0.79.

In the optical image lens assembly according to the 1st embodiment, when a curvature radius of the object-side surface 161 of the sixth lens element 160 is R11, and a curvature radius of the image-side surface 162 of the sixth lens element 160 is R12, the following conditions are satisfied: |(R11+R12)/(R11−R12)|=0.83.

In the optical image lens assembly according to the 1st embodiment, when a focal length of the first lens element 110 is f1, and a focal length of the sixth lens element 160 is f6, the following condition is satisfied: f1/f6=0.67.

In the optical image lens assembly according to the 1st embodiment, when a focal length of the third lens element 130 is f3, and a focal length of the fifth lens element 150 is f5, the following condition is satisfied: f3/f5=0.92.

The detailed optical data of the 1st embodiment are shown in Table 1 and the aspheric surface data are shown in Table 2 below.

TABLE 1

1st Embodiment
f = 0.79 mm, Fno = 2.10, HFOV = 60.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.575 | ASP | 0.357 | Plastic | 1.544 | 55.9 | −1.76 |
| 2 | | 0.663 | ASP | 0.824 | | | | |
| 3 | Lens 2 | 0.998 | ASP | 0.230 | Plastic | 1.544 | 55.9 | −4.27 |
| 4 | | 0.641 | ASP | 0.338 | | | | |
| 5 | Ape. Stop | Plano | | 0.000 | | | | |
| 6 | Lens 3 | 1.548 | ASP | 0.729 | Plastic | 1.544 | 55.9 | 0.98 |
| 7 | | −0.675 | ASP | 0.050 | | | | |
| 8 | Lens 4 | 12.284 | ASP | 0.300 | Plastic | 1.660 | 20.4 | −2.48 |
| 9 | | 1.431 | ASP | 0.065 | | | | |
| 10 | Lens 5 | 5.203 | ASP | 1.213 | Plastic | 1.544 | 55.9 | 1.07 |
| 11 | | −0.604 | ASP | 0.050 | | | | |
| 12 | Lens 6 | −1.903 | ASP | 0.352 | Plastic | 1.660 | 20.4 | −2.62 |
| 13 | | 20.000 | ASP | 0.300 | | | | |
| 14 | IR-cut filter | Plano | | 0.110 | Glass | 1.517 | 64.2 | — |
| 15 | | Plano | | 0.168 | | | | |
| 16 | Image | Plano | | — | | | | |

Reference wavelength is 587.6 nm (d-line).

Table 2

Aspheric Coefficients

| Surface # | 1 | 2 | 3 | 4 | 6 | 7 |
|---|---|---|---|---|---|---|
| k = | 7.6421E−01 | −7.9535E−01 | −9.9228E−01 | 4.9880E−01 | 1.9495E+00 | −4.4661E−01 |
| A4 = | 1.5650E−01 | 7.0338E−02 | −3.8297E−01 | −8.9988E−01 | 2.8385E−02 | −1.1072E+00 |
| A6 = | −1.2160E−01 | 5.1204E−01 | −5.9064E−01 | 7.6718E+00 | −9.0462E−01 | 6.9990E+00 |
| A8 = | 4.5978E−02 | −1.0203E+00 | 3.5441E+00 | −5.0136E+01 | 2.5754E+00 | −1.8076E+01 |
| A10 = | −1.1046E−02 | −2.1878E−01 | −5.7363E+00 | 2.0259E+02 | −2.2601E+00 | 1.8728E+01 |
| A12 = | 2.6628E−03 | 1.0726E+00 | 3.1027E+00 | | | |
| A14 = | −6.1202E−04 | −6.3630E−01 | | | | |
| A16 = | 6.2718E−05 | 1.1991E−01 | | | | |

| Surface # | 8 | 9 | 10 | 11 | 12 | 13 |
|---|---|---|---|---|---|---|
| k = | 3.2756E+01 | −9.7080E+00 | 2.8444E+01 | −1.2565E+00 | −2.1062E+00 | −1.0000E+00 |
| A4 = | −1.9440E+00 | −3.1820E−01 | −3.7716E−02 | 2.3658E−01 | −6.0123E−01 | 9.3811E−02 |
| A6 = | 5.7806E+00 | 1.6934E−01 | 1.0846E+00 | −5.0828E−01 | 3.0603E+00 | 8.8659E−02 |
| A8 = | −9.7624E+00 | 1.5224E+00 | −5.7284E+00 | 3.2974E+00 | −6.6153E+00 | −2.6989E−01 |
| A10 = | 2.7111E+00 | −3.2241E+00 | 1.4333E+01 | −7.7408E+00 | 8.8220E+00 | 1.9012E−01 |
| A12 = | | 2.2967E+00 | −1.9086E+01 | 8.2585E+00 | −7.7872E+00 | −6.3580E−02 |
| A14 = | | −6.0022E−01 | 1.3168E+01 | −4.4661E+00 | 3.8229E+00 | 1.0489E−02 |
| A16 = | | | −3.7894E+00 | 1.0621E+00 | −7.5874E−01 | −6.8084E−04 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
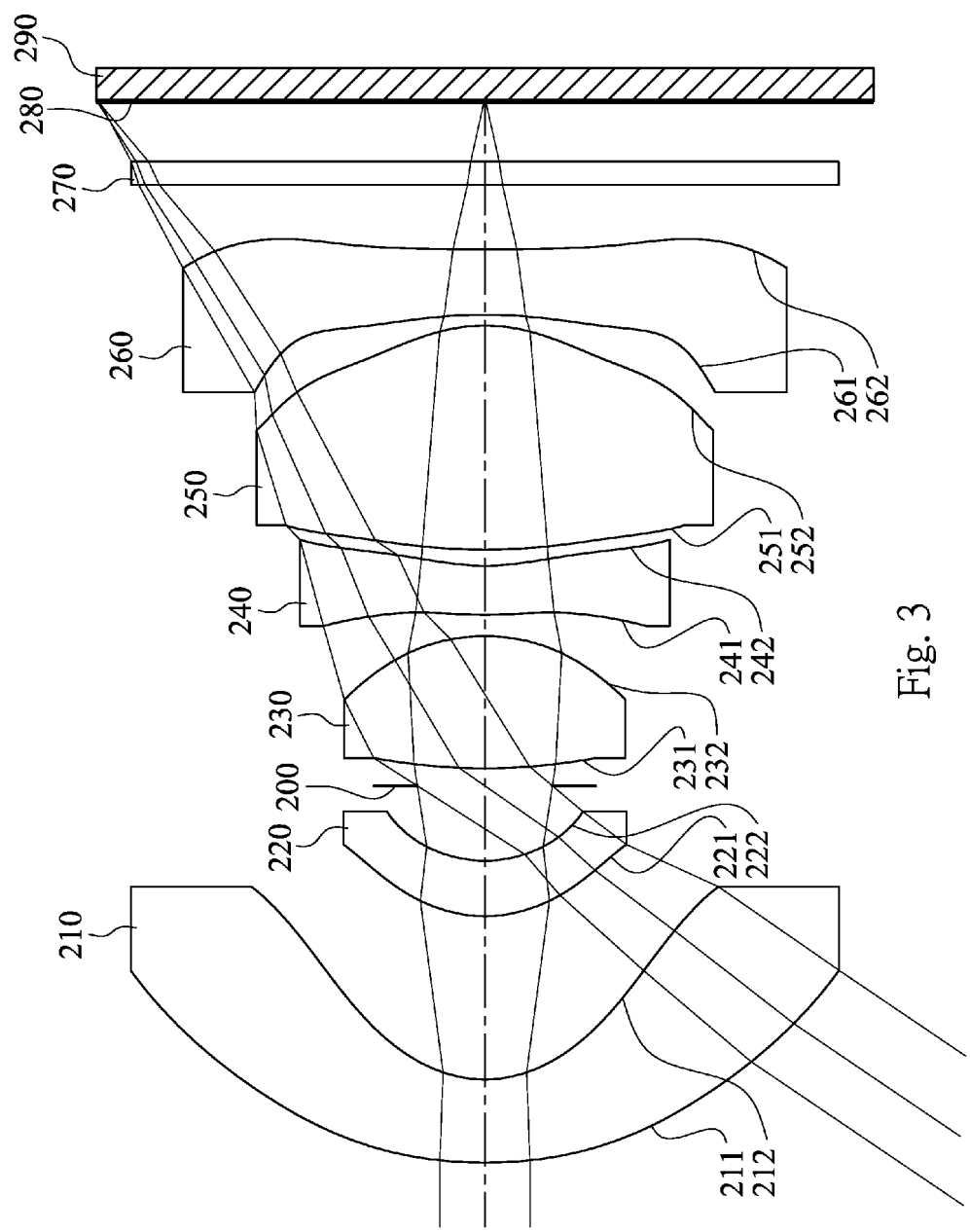
FIG. 3 is a schematic view of an image capturing device according to the 2nd embodiment of the present disclosure.
Figure 4:
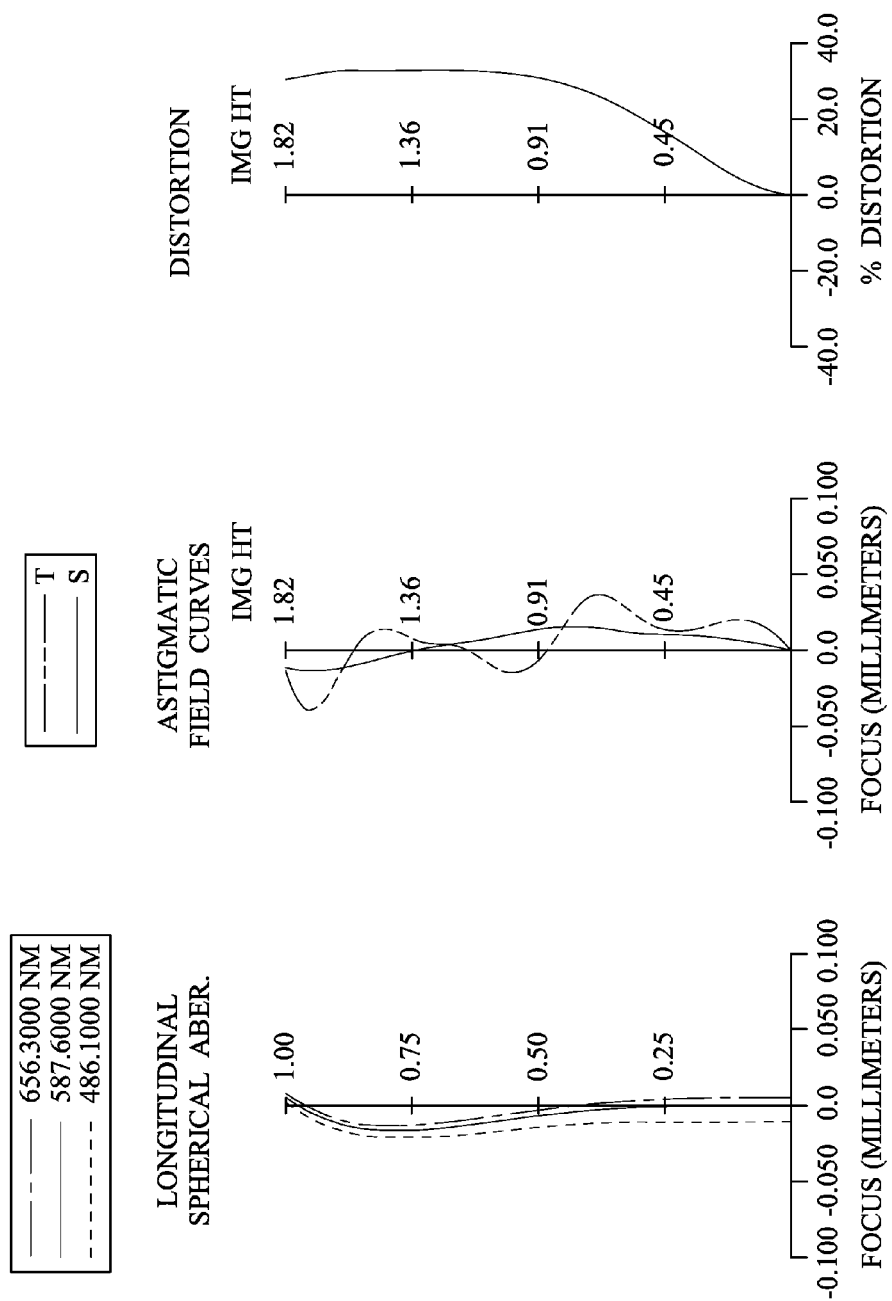
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical image lens assembly (its reference numeral is omitted) and an image sensor 290. The optical image lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the image sensor 290 is disposed on the image surface 280 of the optical image lens assembly. The optical image lens assembly has a total of six lens elements (210-260), and there is an air space between every two lens elements of the first lens element 210, the second lens element 220, the third lens element 230, the fourth lens element 240, the fifth lens element 250 and the sixth lens element 260 that are adjacent to each other.

The first lens element 210 with negative refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the image-side surface 242 of the fourth lens element 240 includes at least one convex shape in an off-axial region thereof.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof.

The IR-cut filter 270 is made of a glass material and located between the sixth lens element 260 and the image surface 280, and will not affect the focal length of the optical image lens assembly.

The detailed optical data of the 2nd embodiment are shown in Table 3 and the aspheric surface data are shown in Table 4 below.

Table 3

2nd Embodiment
f = 0.95 mm, Fno = 2.25, HFOV = 55.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.103 | ASP | 0.389 | Plastic | 1.544 | 55.9 | −1.62 |
| 2 | | 0.581 | ASP | 0.764 | | | | |
| 3 | Lens 2 | 0.636 | ASP | 0.260 | Plastic | 1.660 | 20.4 | 9.42 |
| 4 | | 0.594 | ASP | 0.350 | | | | |
| 5 | Ape. Stop | Plano | | 0.082 | | | | |
| 6 | Lens 3 | 2.875 | ASP | 0.618 | Plastic | 1.544 | 55.9 | 1.45 |
| 7 | | −1.001 | ASP | 0.100 | | | | |
| 8 | Lens 4 | 1.741 | ASP | 0.230 | Plastic | 1.660 | 20.4 | −4.79 |
| 9 | | 1.064 | ASP | 0.075 | | | | |
| 10 | Lens 5 | 2.629 | ASP | 1.049 | Plastic | 1.544 | 55.9 | 1.23 |
| 11 | | −0.773 | ASP | 0.050 | | | | |
| 12 | Lens 6 | −2.731 | ASP | 0.307 | Plastic | 1.660 | 20.4 | −3.64 |
| 13 | | 20.976 | ASP | 0.300 | | | | |
| 14 | IR-cut filter | Plano | | 0.110 | Glass | 1.517 | 64.2 | — |
| 15 | | Plano | | 0.283 | | | | |
| 16 | Image | Plano | | — | | | | |

Reference wavelength is 587.6 nm (d-line).

TABLE 4

Aspheric Coefficients

| Surface # | 1 | 2 | 3 | 4 | 6 | 7 |
|---|---|---|---|---|---|---|
| k = | −3.8672E+00 | −8.3414E−01 | −3.9848E−01 | 1.9985E−01 | −2.9148E+00 | 2.9185E−01 |
| A4 = | 1.6007E−01 | −2.0898E−02 | −2.1731E−01 | −4.5124E−01 | 1.0968E−01 | −1.1989E+00 |
| A6 = | −1.0465E−01 | 5.1988E−01 | 2.4462E−01 | 3.8965E+00 | −4.4885E−01 | 5.2796E+00 |
| A8 = | 4.1639E−02 | −1.0078E+00 | −7.5333E−01 | −2.2181E+01 | 3.1892E−01 | −1.0311E+01 |
| A10 = | −1.0760E−02 | −2.2874E−01 | −4.3216E+00 | 6.5470E+01 | 5.4522E−01 | 7.9534E+00 |
| A12 = | 2.7808E−03 | 1.0726E+00 | 3.1027E+00 | | | |
| A14 = | −5.7982E−04 | −6.3630E−01 | | | | |
| A16 = | 5.4062E−05 | 1.1991E−01 | | | | |

| Surface # | 8 | 9 | 10 | 11 | 12 | 13 |
|---|---|---|---|---|---|---|
| k = | 1.6414E+00 | −9.9751E+00 | 5.7756E+00 | −2.2789E+00 | −2.2653E+01 | −1.0000E+00 |
| A4 = | −2.3478E+00 | −5.3745E−01 | −2.1354E−01 | 2.2092E−02 | −5.4554E−01 | −2.4684E−02 |
| A6 = | 6.3283E+01 | 4.3090E−01 | 1.0844E+00 | 1.7084E−01 | 3.0859E+00 | 6.0143E−01 |
| A8 = | −8.9849E+00 | 1.3778E+00 | −5.8604E+00 | 3.6064E+00 | −6.9265E+00 | −1.2929E+00 |
| A10 = | 4.9135E+00 | −3.0169E+00 | 1.4511E+01 | −1.2321E+01 | 8.9940E+00 | 1.1822E+00 |
| A12 = | | 2.2967E+00 | −1.9086E+01 | 1.5589E+01 | −7.7872E+00 | −5.7131E−01 |
| A14 = | | −6.0022E−01 | 1.3168E+01 | −9.1162E+00 | 3.8229E+00 | 1.4321E−01 |
| A16 = | | | −3.7894E+00 | 2.0930E+00 | −7.5874E−01 | −1.4685E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 0.95 | ImgH/BL | 2.62 |
| Fno | 2.25 | ImgH/f | 1.91 |
| HFOV [deg.] | 55.9 | SD11/ImgH | 0.91 |
| (V4 + V6)/V5 | 0.73 | (R7 + R8)/(R7-R8) | 4.14 |
| CT1/CT2 | 1.50 | (R9 + R10)/(R9-R10) | 0.55 |
| T12/T23 | 1.77 | |(R11 + R12)/(R11-R12)| | 0.77 |
| (T12 + T56)/(T23 + T34 + T45) | 1.34 | f1/f6 | 0.45 |
| CT5/T56 | 20.98 | f3/f5 | 1.18 |

3rd Embodiment

Figure 5:
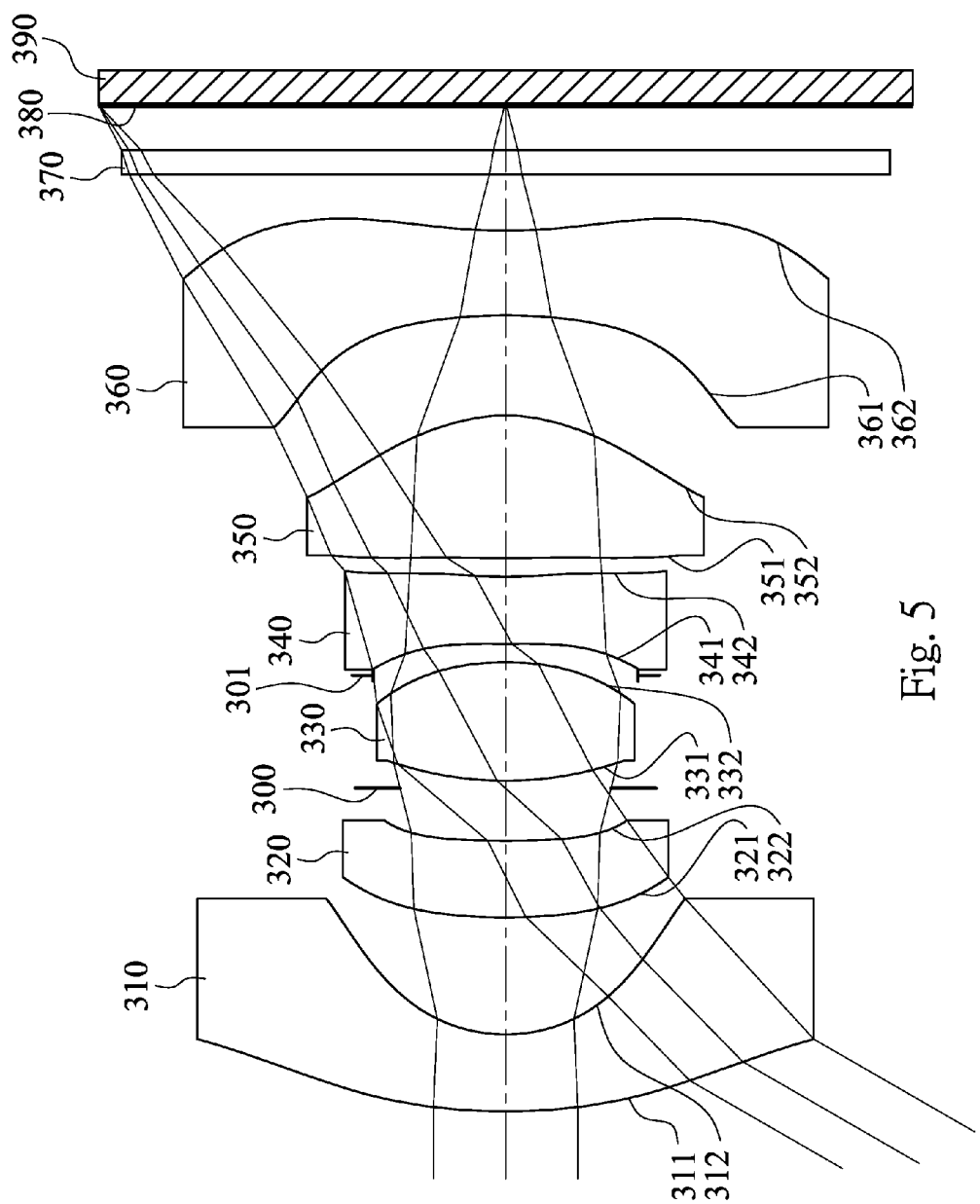
FIG. 5 is a schematic view of an image capturing device according to the 3rd embodiment of the present disclosure.
Figure 6:
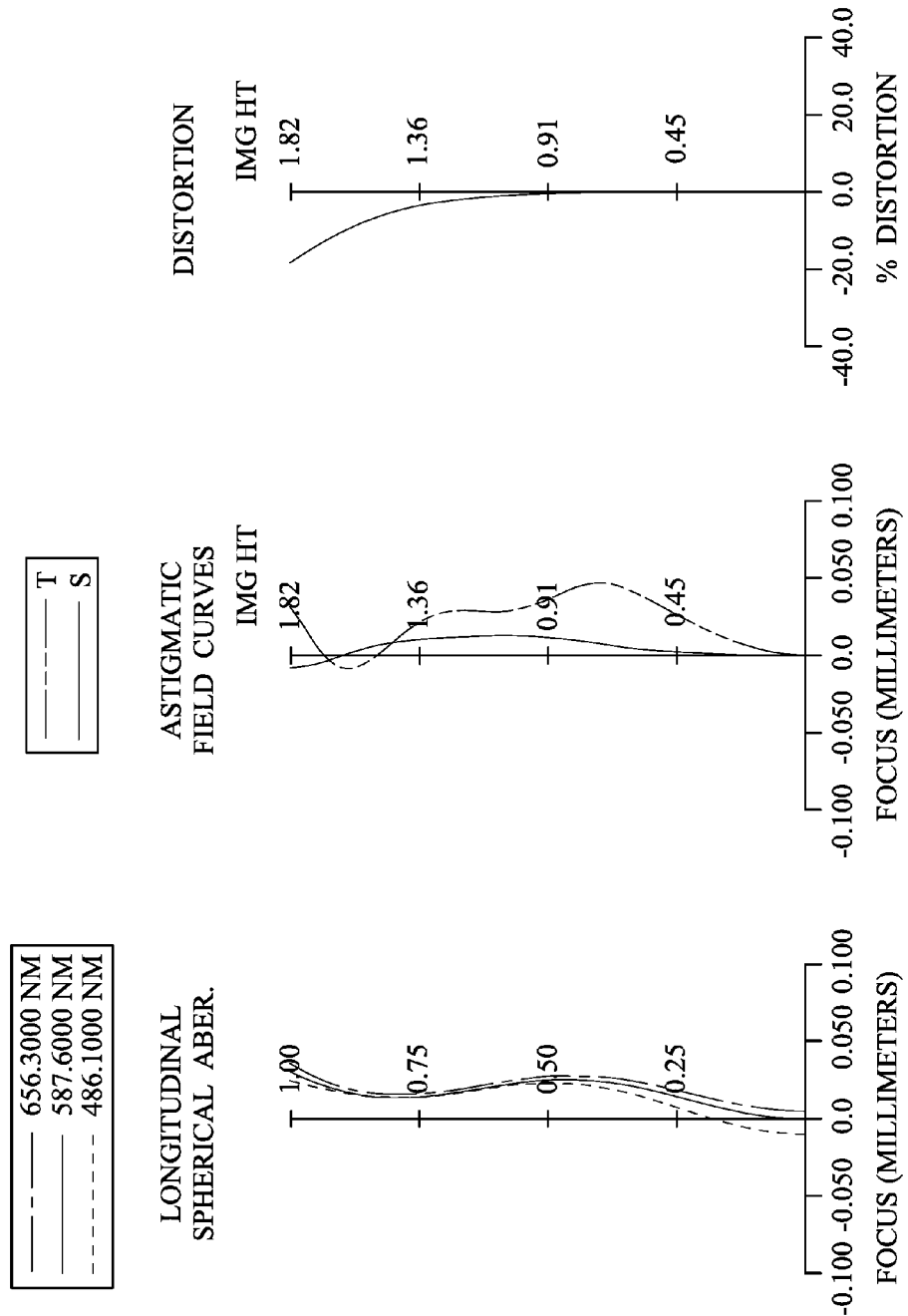
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical image lens assembly (its reference numeral is omitted) and an image sensor 390. The optical image lens assembly includes, in order from an object side to an image side, a first lens element 310, a second lens element 320, an aperture stop 300, a third lens element 330, a stop 301, a fourth lens element 340, a fifth lens element 350, a sixth lens element 360, an IR-cut filter 370 and an image surface 380, wherein the image sensor 390 is disposed on the image surface 380 of the optical image lens assembly. The optical image lens assembly has a total of six lens elements (310-360), and there is an air space between every two lens elements of the first lens element 310, the second lens element 320, the third lens element 330, the fourth lens element 340, the fifth lens element 350 and the sixth lens element 360 that are adjacent to each other.

The first lens element 310 with negative refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the image-side surface 342 of the fourth lens element 340 includes at least one convex shape in an off-axial region thereof.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of a glass material and located between the sixth lens element 360 and the image surface 380, and will not affect the focal length of the optical image lens assembly.

The detailed optical data of the 3rd embodiment are shown in Table 5 and the aspheric surface data are shown in Table 6 below.

TABLE 5

3rd Embodiment
f = 1.27 mm, Fno = 1.98, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.994 | ASP | 0.343 | Plastic | 1.544 | 55.9 | −1.83 |
| 2 | | 0.716 | ASP | 0.522 | | | | |
| 3 | Lens 2 | 2.740 | ASP | 0.342 | Plastic | 1.660 | 20.4 | 8.23 |
| 4 | | 5.254 | ASP | 0.234 | | | | |
| 5 | Ape. Stop | Plano | | 0.034 | | | | |
| 6 | Lens 3 | 1.693 | ASP | 0.528 | Plastic | 1.544 | 55.9 | 1.55 |
| 7 | | −1.492 | ASP | −0.058 | | | | |
| 8 | Stop | Plano | | 0.140 | | | | |
| 9 | Lens 4 | 9.637 | ASP | 0.300 | Plastic | 1.660 | 20.4 | −4.00 |
| 10 | | 2.046 | ASP | 0.082 | | | | |
| 11 | Lens 5 | 8.037 | ASP | 0.637 | Plastic | 1.544 | 55.9 | 1.36 |
| 12 | | −0.793 | ASP | 0.447 | | | | |
| 13 | Lens 6 | −2.169 | ASP | 0.378 | Plastic | 1.639 | 23.3 | −1.76 |
| 14 | | 2.506 | ASP | 0.250 | | | | |
| 15 | IR-cut filter | Plano | | 0.110 | Glass | 1.517 | 64.2 | — |
| 16 | | Plano | | 0.199 | | | | |
| 17 | Image | Plano | | — | | | | |

Reference wavelength is 587.6 nm (d-line).
Effective radius of the surface 2 is 0.800 mm.
Effective radius of the surface 8 is 0.590 mm.

TABLE 6

Aspheric Coefficients

| Surface # | | | | | | |
|---|---|---|---|---|---|---|
| | 1 | 2 | 3 | 4 | 6 | 7 |
| k = | 4.8017E−01 | −8.0973E−01 | −7.0772E+01 | 8.5948E+01 | 5.1013E+00 | 1.4545E+00 |
| A4 = | 1.1933E−01 | 4.2492E−01 | 6.3453E−01 | 5.1433E−01 | −7.5924E−03 | −1.6305E+00 |
| A6 = | −1.3703E−01 | 5.8924E−01 | −8.3402E−01 | −1.1775E+00 | 4.3637E−01 | 9.1027E+00 |
| A8 = | 5.0936E−02 | −1.9059E+00 | 1.1933E+00 | 8.3730E+00 | −5.6751E+00 | −3.3109E+01 |
| A10 = | −7.2077E−03 | 2.5625E+00 | 3.7775E−01 | −2.0105E+01 | 1.3706E+01 | 6.1877E+01 |
| A12 = | | −2.2544E+00 | −1.7740E+00 | 2.5370E+01 | −1.8935E+01 | −4.7851E+01 |

TABLE 6-continued

Aspheric Coefficients

| Surface # | | | | | |
|---|---|---|---|---|---|
| 9 | 10 | 11 | 12 | 13 | 14 |
| k = −7.4535E+01 | −9.3148E+00 | 9.0000E+01 | −1.2679E+00 | 2.9038E+00 | −5.8479E+01 |
| A4 = −2.4898E+00 | −1.2471E+00 | −2.9181E−01 | 3.3019E−01 | 2.3191E−01 | 2.6404E−01 |
| A6 = 8.9465E+00 | 1.5146E+00 | −2.7503E+00 | −7.7310E−01 | −5.8554E−01 | −1.1613E+00 |
| A8 = −1.3451E+01 | 1.4318E+01 | 2.3251E+01 | 1.6603E−01 | −3.1090E+00 | 1.7449E+00 |
| A10 = −4.3440E+01 | −6.2638E+01 | −6.4864E+01 | 3.7959E+00 | 1.2674E+01 | −1.4461E+00 |
| A12 = 1.7718E+02 | 9.6454E+01 | 7.9606E+01 | −6.8780E+00 | −1.9184E+01 | 6.8336E−01 |
| A14 = −1.6104E+02 | −5.1078E+01 | −3.6633E+01 | 3.7027E+00 | 1.3200E+01 | −1.7412E−01 |
| A16 = | | | | −3.3686E+00 | 1.8741E−02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.27 | ImgH/BL | 3.24 |
| Fno | 1.98 | ImgH/f | 1.43 |
| HFOV [deg.] | 60.0 | SD11/ImgH | 0.76 |
| (V4 + V6)/V5 | 0.78 | (R7 + R8)/(R7 − R8) | 1.54 |
| CT1/CT2 | 1.00 | (R9 + R10)/(R9 − R10) | 0.82 |
| T12/T23 | 1.95 | |(R11 + R12)/(R11 − R12)| | 0.07 |
| (T12 + T56)/(T23 + T34 + T45) | 2.24 | f1/f6 | 1.04 |
| CT5/T56 | 1.43 | f3/f5 | 1.14 |

4th Embodiment

Figure 7:
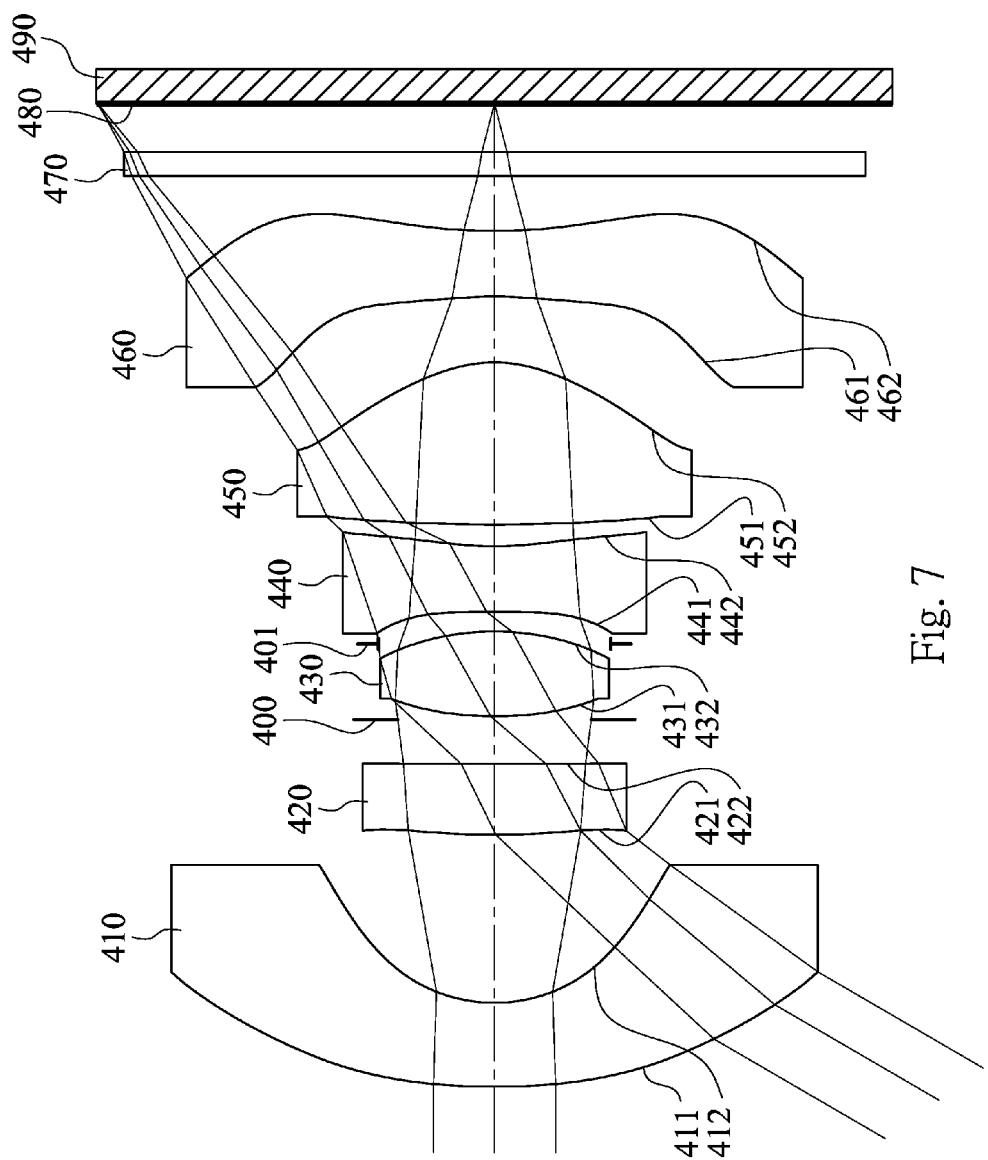
FIG. 7 is a schematic view of an image capturing device according to the 4th embodiment of the present disclosure.
Figure 8:
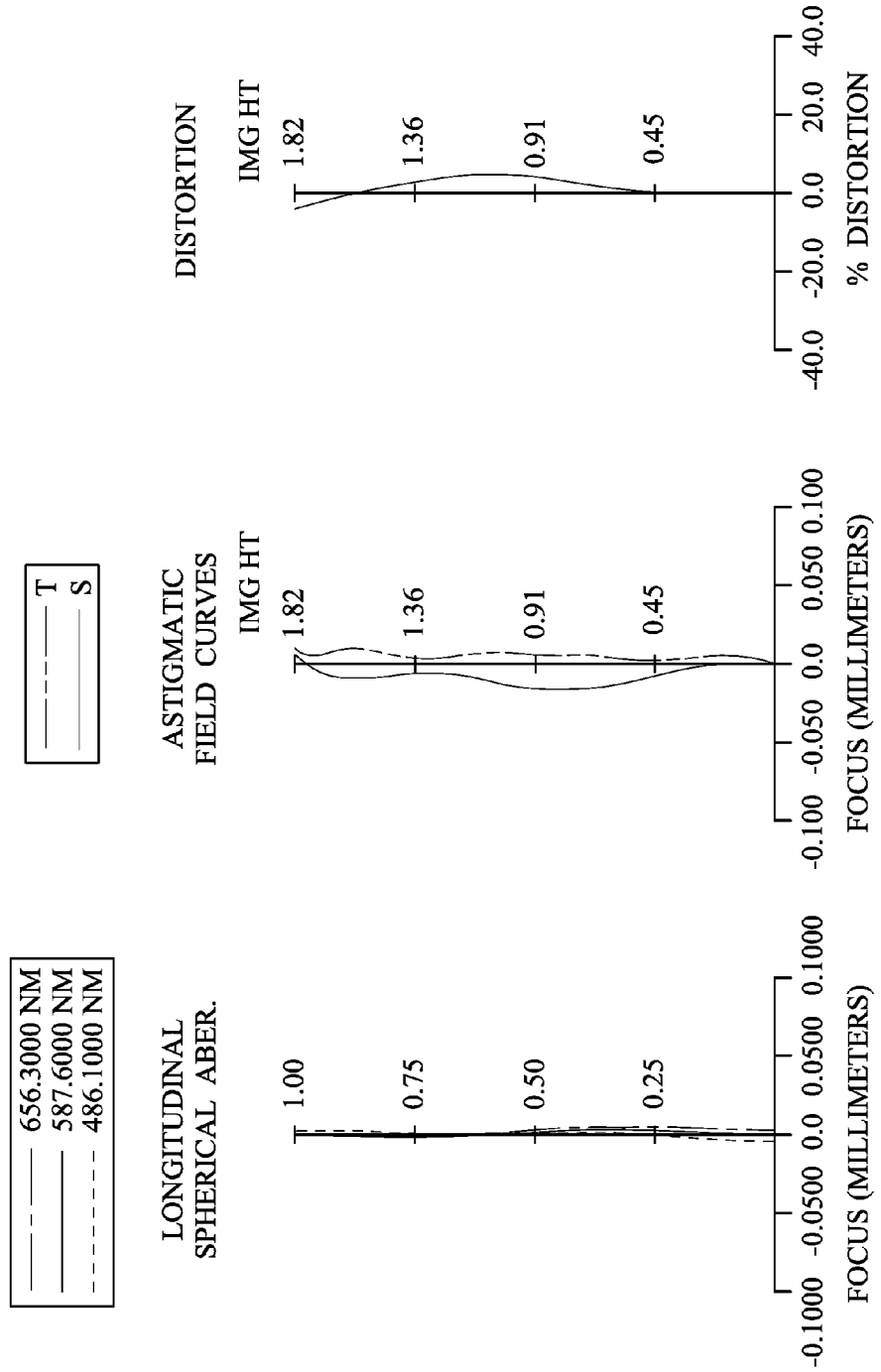
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical image lens assembly (its reference numeral is omitted) and an image sensor 490. The optical image lens assembly includes, in order from an object side to an image side, a first lens element 410, a second lens element 420, an aperture stop 400, a third lens element 430, a stop 401, a fourth lens element 440, a fifth lens element 450, a sixth lens element 460, an IR-cut filter 470 and an image surface 480, wherein the image sensor 490 is disposed on the image surface 480 of the optical image lens assembly. The optical image lens assembly has a total of six lens elements (410-460), and there is an air space between every two lens elements of the first lens element 410, the second lens element 420, the third lens element 430, the fourth lens element 440, the fifth lens element 450 and the sixth lens element 460 that are adjacent to each other.

The first lens element 410 with negative refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the image-side surface 442 of the fourth lens element 440 includes at least one convex shape in an off-axial region thereof.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof.

The IR-cut filter 470 is made of a glass material and located between the sixth lens element 460 and the image surface 480, and will not affect the focal length of the optical image lens assembly.

The detailed optical data of the 4th embodiment are shown in Table 7 and the aspheric surface data are shown in Table 8 below.

TABLE 7

4th Embodiment
f = 1.10 mm, Fno = 1.98, HFOV = 59.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.461 | ASP | 0.383 | Plastic | 1.544 | 55.9 | −1.82 |
| 2 | | 0.739 | ASP | 0.767 | | | | |
| 3 | Lens 2 | 34.50 | ASP | 0.323 | Plastic | 1.660 | 20.4 | 5.26 |
| 4 | | 566.064 | ASP | 0.203 | | | | |
| 5 | Ape. Stop | Plano | | 0.015 | | | | |
| 6 | Lens 3 | 1.789 | ASP | 0.387 | Plastic | 1.544 | 55.9 | 1.46 |
| 7 | | −1.312 | ASP | −0.056 | | | | |
| 8 | Stop | Plano | | 0.145 | | | | |
| 9 | Lens 4 | 27.232 | ASP | 0.300 | Plastic | 1.660 | 20.4 | −2.31 |
| 10 | | 1.437 | ASP | 0.099 | | | | |
| 11 | Lens 5 | 6.628 | ASP | 0.741 | Plastic | 1.544 | 55.9 | 1.08 |
| 12 | | −0.6.17 | ASP | 0.301 | | | | |
| 13 | Lens 6 | −1.736 | ASP | 0.300 | Plastic | 1.660 | 20.4 | −1.65 |
| 14 | | 3.130 | ASP | 0.250 | | | | |
| 15 | IR-cut filter | Plano | | 0.110 | Glass | 1.517 | 64.2 | — |
| 16 | | Plano | | 0.222 | | | | |
| 17 | Image | Plano | | — | | | | |

Reference wavelength is 587.6 nm (d-line).
Effective radius of the surface 2 is 0.800 mm.
Effective radius of the surface 8 is 0.530 mm.

TABLE 8

Aspheric Coefficients

| | Surface # | | | | |
|---|---|---|---|---|---|
| 1 | 2 | 3 | 4 | 6 | 7 |

| | | | | | |
|---|---|---|---|---|---|
| k = | 3.3653E+00 | −6.1265E−01 | −7.0859E+01 | 9.0000E+01 | 5.0404E+00 | 1.7375E+00 |
| A4 = | 1.2640E−01 | 3.5004E−01 | 1.7870E−01 | 2.3792E−01 | 3.3662E−01 | −5.2893E−01 |
| A6 = | −9.0682E−02 | 4.7360E−01 | −1.0167E+00 | −1.2220E+00 | −2.3210E−01 | 4.7941E+00 |
| A8 = | 2.3166E−02 | −1.0810E+00 | 1.1669E+00 | 3.7049E+00 | −2.9550E+00 | −2.0094E+01 |
| A10 = | −1.8592E−03 | 1.5352E+00 | −4.7173E+00 | −1.4689E+01 | 1.2127E+01 | 4.4490E+01 |
| A12 = | | −1.7289E+00 | 6.0868E+00 | 2.8006E+01 | −2.5845E+01 | −4.8106E+01 |

| | Surface # | | | | |
|---|---|---|---|---|---|
| 9 | 10 | 11 | 12 | 13 | 14 |

| | | | | | |
|---|---|---|---|---|---|
| k = | −7.4535E+01 | −1.1520E+01 | 5.4872E+01 | −1.6128E+00 | −1.5552E+00 | −5.8479E+01 |
| A4 = | −1.8732E+00 | −7.5891E−01 | −1.1946E−01 | 6.9910E−01 | 1.3978E+00 | 4.6811E−01 |
| A6 = | 6.4090E+00 | 2.6720E+00 | 2.7768E−01 | −2.3771E+00 | −4.9972E+00 | −1.4052E+00 |
| A8 = | −2.9577E+01 | −7.9205E+00 | −1.2673E+00 | 4.9707E+00 | 9.7188E+00 | 1.8251E+00 |
| A10 = | 9.8416E+01 | 1.8375E+01 | 3.8565E+00 | −7.2671E+00 | −1.5091E+01 | −1.3557E+01 |
| A12 = | −2.5368E+02 | −2.6734E+01 | −5.4084E+00 | 6.6469E+00 | 1.1645E+01 | 7.6740E−01 |
| A14 = | 3.2070E+02 | 1.8348E+01 | 2.7551E+00 | −2.4387E+00 | −5.1847E+00 | −2.1448E−01 |
| A16 = | | | | | 9.1186E−01 | 2.5135E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

4th Embodiment

| | | | |
|---|---|---|---|
| f [mm] | 1.10 | ImgH/BL | 3.11 |
| Fno | 1.98 | ImgH/f | 1.65 |
| HFOV [deg.] | 59.8 | SD11/ImgH | 0.81 |
| (V4 + V6)/V5 | 0.73 | (R7 + R8)/(R7 − R8) | 1.11 |
| CT1/CT2 | 1.19 | (R9 + R10)/(R9 − R10) | 0.83 |

-continued

4th Embodiment

| | | | |
|---|---|---|---|
| T12/T23 | 3.52 | |(R11 + R12)/(R11 − R12)| | 0.29 |
| (T12 + T56)/(T23 + T34 + T45) | 2.63 | f1/f6 | 1.10 |
| CT5/T56 | 2.46 | f3/f5 | 1.35 |

5th Embodiment

Figure 9:
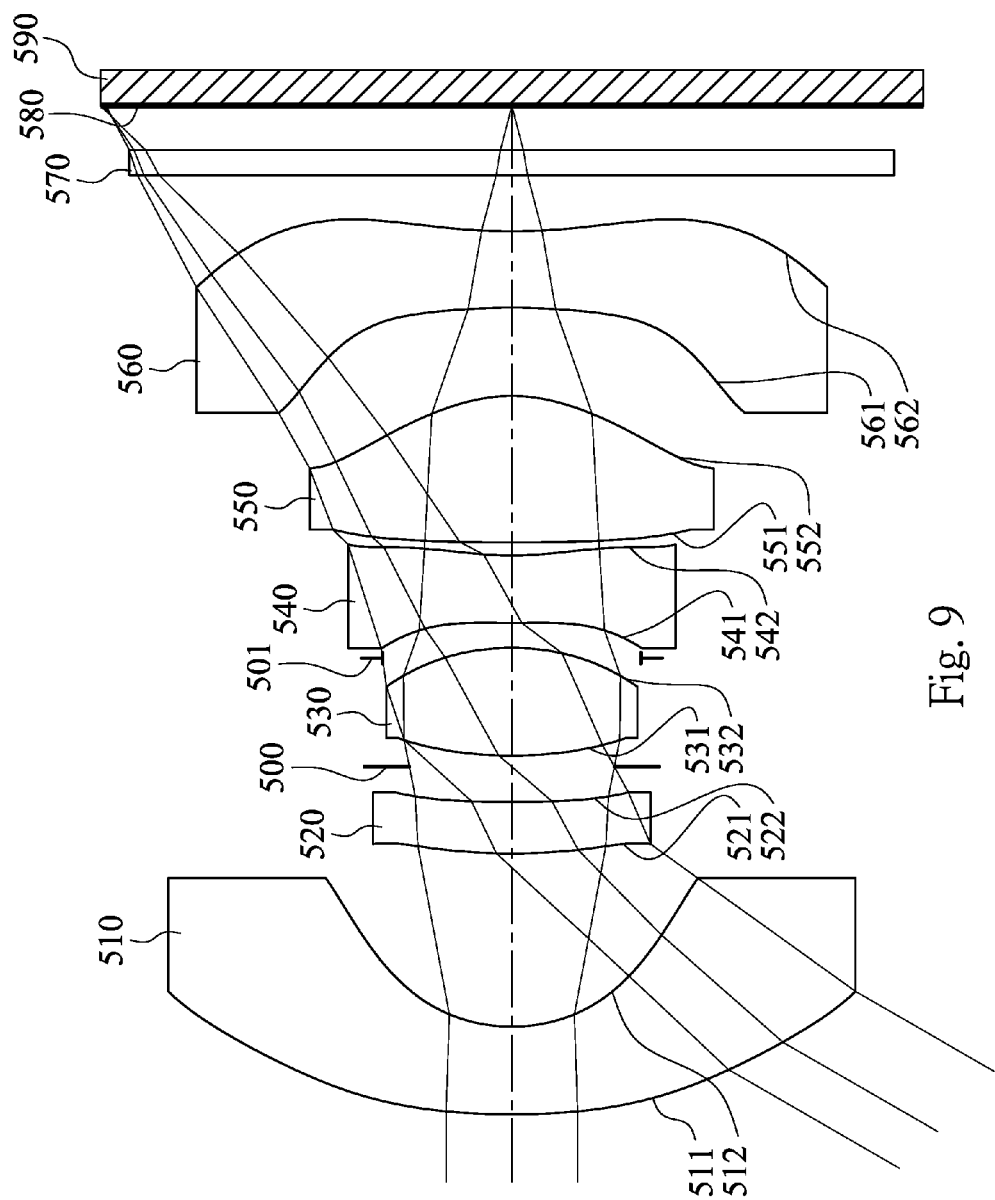
FIG. 9 is a schematic view of an image capturing device according to the 5th embodiment of the present disclosure.
Figure 10:
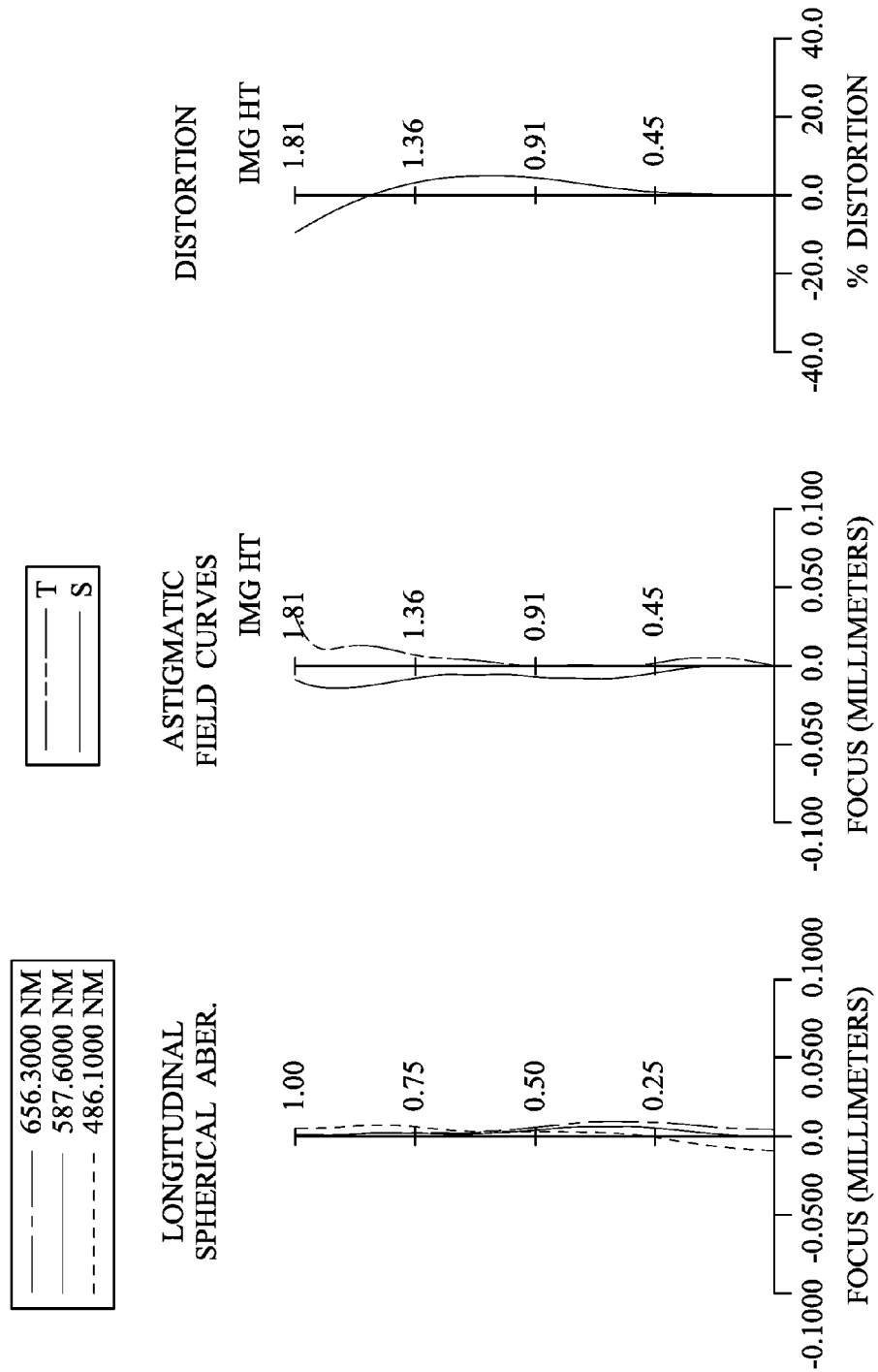
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical image lens assembly (its reference numeral is omitted) and an image sensor 590. The optical image lens assembly includes, in order from an object side to an image side, a first lens element 510, a second lens element 520, an aperture stop 500, a third lens element 530, a stop 501, a fourth lens element 540, a fifth lens element 550, a sixth lens element 560, an IR-cut filter 570 and an image surface 580, wherein the image sensor 590 is disposed on the image surface 580 of the optical image lens assembly. The optical image lens assembly has a total of six lens elements (510-560), and there is an air space between every two lens elements of the first lens element 510, the second lens element 520, the third lens element 530, the fourth lens element 540, the fifth lens element 550 and the sixth lens element 560 that are adjacent to each other.

The first lens element 510 with negative refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the image-side surface 542 of the fourth lens element 540 includes at least one convex shape in an off-axial region thereof.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 is made of a glass material and located between the sixth lens element 560 and the image surface 580, and will not affect the focal length of the optical image lens assembly.

The detailed optical data of the 5th embodiment are shown in Table 9 and the aspheric surface data are shown in Table 10 below.

TABLE 9

5th Embodiment
f = 1.16 mm, Fno = 1.98, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.650 | ASP | 0.390 | Plastic | 1.544 | 55.9 | −1.81 |
| 2 | | 0.746 | ASP | 0.771 | | | | |
| 3 | Lens 2 | 2.828 | ASP | 0.230 | Plastic | 1.660 | 20.4 | 6.03 |
| 4 | | 9.435 | ASP | 0.156 | | | | |
| 5 | Ape. Stop | Plano | | 0.050 | | | | |
| 6 | Lens 3 | 2.192 | ASP | 0.479 | Plastic | 1.544 | 55.9 | 1.52 |
| 7 | | −1.221 | ASP | −0.045 | | | | |
| 8 | Stop | Plano | | 0.156 | | | | |
| 9 | Lens 4 | 5.672 | ASP | 0.300 | Plastic | 1.660 | 20.4 | −2.79 |
| 10 | | 1.362 | ASP | 0.058 | | | | |
| 11 | Lens 5 | 12.425 | ASP | 0.653 | Plastic | 1.544 | 55.9 | 1.28 |
| 12 | | −0.721 | ASP | 0.393 | | | | |
| 13 | Lens 6 | −2.582 | ASP | 0.340 | Plastic | 1.660 | 20.4 | −1.97 |
| 14 | | 2.759 | ASP | 0.250 | | | | |
| 15 | IR-cut filter | Plano | | 0.110 | Glass | 1.517 | 64.2 | — |
| 16 | | Plano | | 0.199 | | | | |
| 17 | Image | Plano | | — | | | | |

Reference wavelength is 587.6 nm (d-line).
Effective radius of the surface 8 is 0.575 mm.

TABLE 10

Aspheric Coefficients

| Surface # | | | | | | |
|---|---|---|---|---|---|---|
| | 1 | 2 | 3 | 4 | 6 | 7 |
| k = | 3.2409E+00 | −6.0738E−01 | −7.0785E+01 | 8.5941E+01 | 5.1015E+00 | 1.8449E+00 |
| A4 = | 1.4506E−01 | 4.0498E−01 | 5.4350E−01 | 5.8424E−01 | 3.2557E−01 | −1.0834E+00 |
| A6 = | −1.0538E−01 | 2.3530E−01 | −2.0018E+00 | −1.7593E+00 | 2.4636E−01 | 7.5542E+00 |
| A8 = | 2.7351E−02 | −8.2562E−02 | 5.4177E+00 | 1.1236E+01 | −6.0564E+00 | −2.8345E+01 |
| A10 = | −2.0212E−03 | −8.4860E−01 | −1.7776E+01 | −5.4859E+01 | 1.9279E+01 | 5.9266E+01 |
| A12 = | | 7.9760E−02 | 1.8999E+01 | 9.8383E+01 | −2.6513E+01 | −5.1641E+01 |

TABLE 10-continued

Aspheric Coefficients

| Surface # | | | | | |
|---|---|---|---|---|---|
| 9 | 10 | 11 | 12 | 13 | 14 |
| k = −7.4535E+01 | −9.3128E+00 | 9.0000E+01 | −1.6688E+00 | 2.9038E+00 | −5.8479E+01 |
| A4 = −2.4922E+00 | −1.0710E+00 | 2.5600E−01 | 4.3244E−01 | 5.4553E−01 | 3.0927E−01 |
| A6 = 8.1119E+00 | 2.5498E+00 | −2.0450E+00 | −1.2639E+00 | −2.1957E+00 | −1.2572E+00 |
| A8 = −2.0885E+01 | −3.6332E+00 | 8.0872E+00 | 2.7484E+00 | 2.0508E+00 | 1.8100E+00 |
| A10 = 2.3191E+01 | 3.8086E+00 | −1.5952E+01 | −3.9987E+00 | 4.7408E−01 | −1.5239E+00 |
| A12 = 7.4167E+00 | −3.1481E+00 | 1.6438E+01 | 4.0167E+00 | −3.1328E+00 | 7.6584E−01 |
| A14 = −1.7237E+01 | 2.5700E+00 | −7.1091E+00 | −1.7320E+00 | 2.9667E+00 | −2.1288E−01 |
| A16 = | | | | −9.0821E−01 | 2.5225E−02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.16 | ImgH/BL | 3.24 |
| Fno | 1.98 | ImgH/f | 1.56 |
| HFOV [deg.] | 60.0 | SD11/ImgH | 0.84 |
| (V4 + V6)/V5 | 0.73 | (R7 + R8)/(R7 − R8) | 1.63 |
| CT1/CT2 | 1.70 | (R9 + R10)/(R9 − R10) | 0.89 |
| T12/T23 | 3.74 | |(R11 + R12)/(R11 − R12)| | 0.03 |
| (T12 + T56)/(T23 + T34 + T45) | 3.10 | f1/f6 | 0.92 |
| CT5/T56 | 1.66 | f3/f5 | 1.19 |

6th Embodiment

Figure 11:
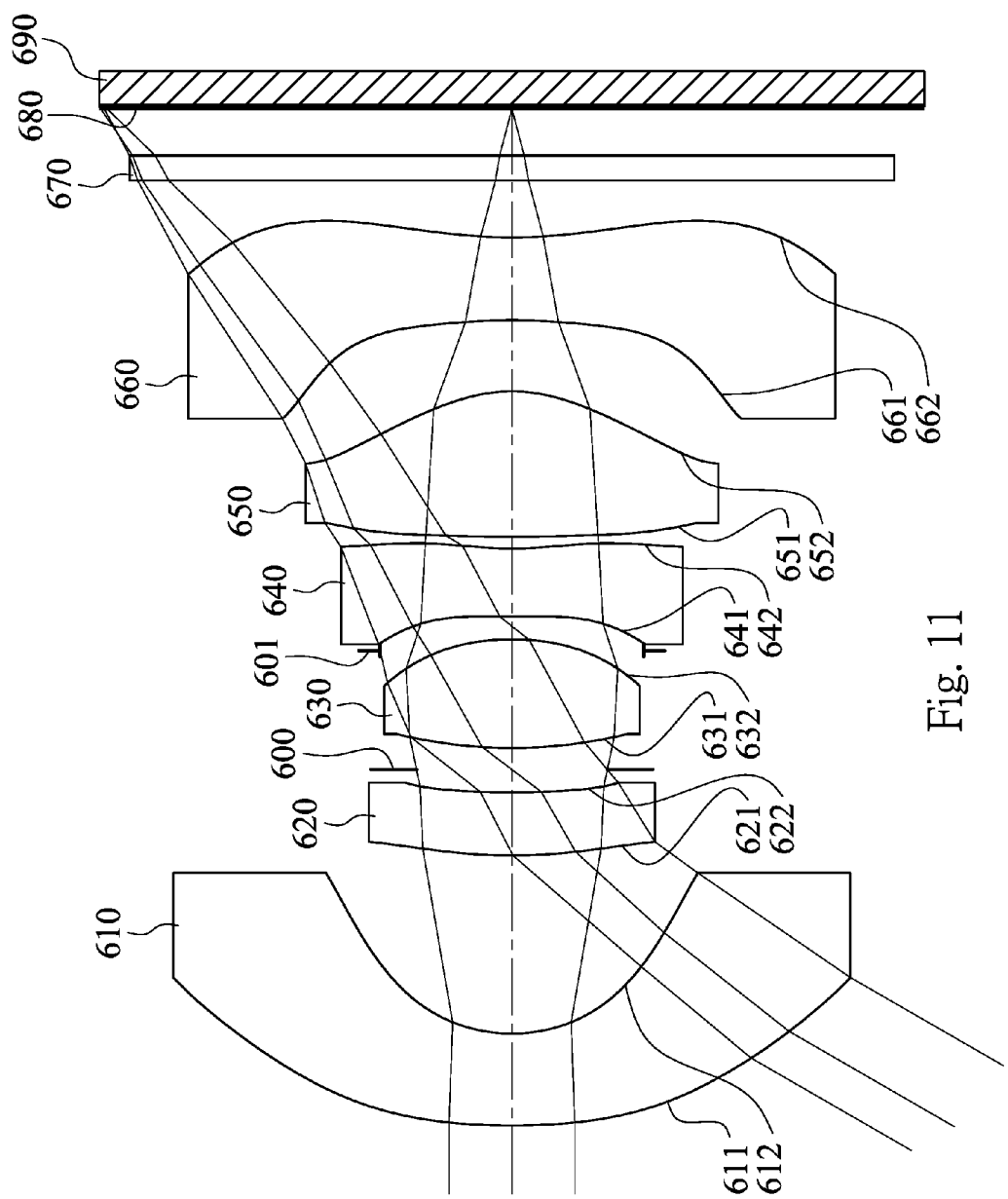
FIG. 11 is a schematic view of an image capturing device according to the 6th embodiment of the present disclosure.
Figure 12:
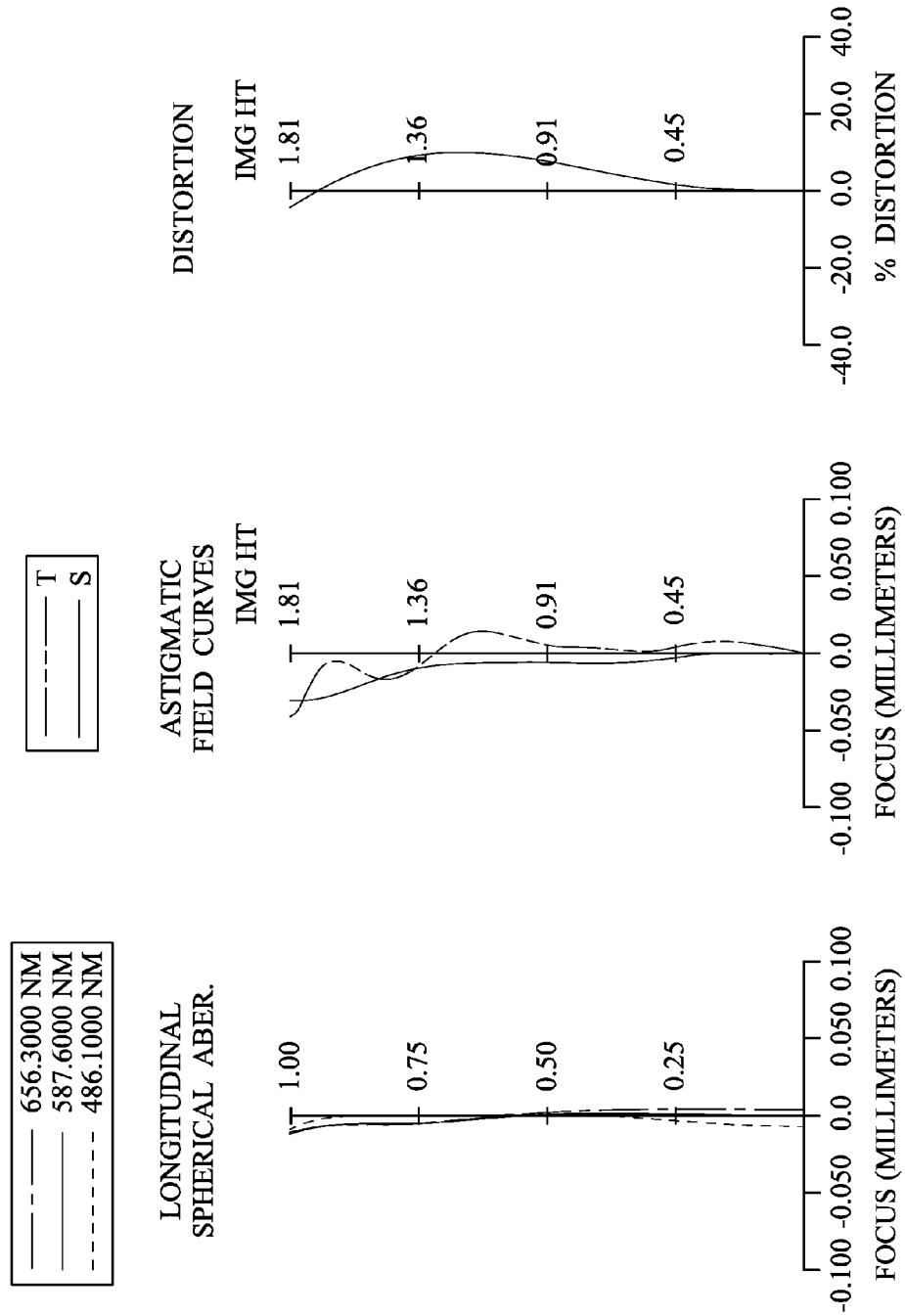
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an optical image lens assembly (its reference numeral is omitted) and an image sensor 690. The optical image lens assembly includes, in order from an object side to an image side, a first lens element 610, a second lens element 620, an aperture stop 600, a third lens element 630, a stop 601, a fourth lens element 640, a fifth lens element 650, a sixth lens element 660, an IR-cut filter 670 and an image surface 680, wherein the image sensor 690 is disposed on the image surface 680 of the optical image lens assembly. The optical image lens assembly has a total of six lens elements (610-660), and there is an air space between every two lens elements of the first lens element 610, the second lens element 620, the third lens element 630, the fourth lens element 640, the fifth lens element 650 and the sixth lens element 660 that are adjacent to each other.

The first lens element 610 with negative refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the image-side surface 642 of the fourth lens element 640 includes at least one convex shape in an off-axial region thereof.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axial region thereof.

The IR-cut filter 670 is made of a glass material and located between the sixth lens element 660 and the image surface 680, and will not affect the focal length of the optical image lens assembly.

The detailed optical data of the 6th embodiment are shown in Table 11 and the aspheric surface data are shown in Table 12 below.

TABLE 11

6th Embodiment
f = 1.09 mm, Fno = 1.98, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.151 | ASP | 0.405 | Plastic | 1.544 | 55.9 | −1.83 |
| 2 | | 0.722 | ASP | 0.784 | | | | |
| 3 | Lens 2 | 2.463 | ASP | 0.278 | Plastic | 1.660 | 20.4 | 7.69 |
| 4 | | 4.567 | ASP | 0.100 | | | | |
| 5 | Ape. Stop | Plano | | 0.095 | | | | |
| 6 | Lens 3 | 2.283 | ASP | 0.478 | Plastic | 1.544 | 55.9 | 1.55 |
| 7 | | −1.239 | ASP | −0.050 | | | | |
| 8 | Stop | Plano | | 0.150 | | | | |
| 9 | Lens 4 | 4.918 | ASP | 0.300 | Plastic | 1.660 | 20.4 | −3.49 |
| 10 | | 1.531 | ASP | 0.052 | | | | |
| 11 | Lens 5 | 8.461 | ASP | 0.640 | Plastic | 1.544 | 55.9 | 1.17 |
| 12 | | −0.668 | ASP | 0.313 | | | | |
| 13 | Lens 6 | −2.369 | ASP | 0.365 | Plastic | 1.660 | 20.4 | −1.67 |
| 14 | | 2.199 | ASP | 0.250 | | | | |
| 15 | IR-cut filter | Plano | | 0.110 | Glass | 1.517 | 64.2 | — |
| 16 | | Plano | | 0.215 | | | | |
| 17 | Image | Plano | | — | | | | |

Reference wavelength is 587.6 nm (d-line).
Effective radius of the surface 8 is 0.580 mm.

TABLE 12

Aspheric Coefficients

| | Surface # | | | | | |
|---|---|---|---|---|---|---|
| | 1 | 2 | 3 | 4 | 6 | 7 |
| k = | 2.3374E+00 | −5.6753E−01 | −7.0772E+01 | 8.5948E+01 | 5.1015E+00 | 2.0245E+00 |
| A4 = | 1.7104E−01 | 4.1006E−01 | 5.1129E−01 | 1.0105E−01 | 8.0387E−02 | −1.5875E+00 |
| A6 = | −1.0242E−01 | 6.2906E−01 | −2.0928E+00 | 1.6666E+00 | 3.0149E+00 | 8.7591E+00 |
| A8 = | 2.1504E−02 | −1.3202E+00 | 4.2726E+00 | −2.4450E+01 | −5.0593E+00 | −2.9105E+01 |
| A10 = | −1.1083E−03 | 1.3108E+00 | −5.7062E+00 | 1.3754E+02 | 1.4172E+01 | 5.0500E+01 |
| A12 = | | −1.4635E+00 | 3.2837E+00 | −2.7546E+02 | −1.5528E+01 | −3.3757E+01 |

| | Surface # | | | | | |
|---|---|---|---|---|---|---|
| | 9 | 10 | 11 | 12 | 13 | 14 |
| k = | −7.4535E+01 | −9.3148E+00 | 9.0000E+01 | −1.7584E+00 | 2.9038E+00 | −5.8479E+01 |
| A4 = | −2.7266E+00 | −1.3270E+00 | −9.3623E−03 | 5.8291E−01 | 5.9257E−01 | 2.8821E−01 |
| A6 = | 8.2074E+00 | 2.7380E+00 | −1.1524E+00 | −1.7598E+00 | −1.6888E+00 | −1.0093E+00 |
| A8 = | −1.5095E+01 | −7.8300E−01 | 7.6216E+00 | 4.8208E+00 | −4.0473E−01 | 1.4193E+00 |
| A10 = | 2.4826E+00 | −6.4344E+00 | −1.9190E+01 | −8.7041E+00 | 7.5132E+00 | −1.1812E+00 |
| A12 = | 2.9395E+01 | 1.0923E+01 | 2.2705E+01 | 8.5809E+00 | −1.4293E+01 | 5.7687E−01 |
| A14 = | −1.9631E+01 | −5.6346E+00 | −1.0638E+01 | −3.2835E+00 | 1.1431E+01 | −1.5316E−01 |
| A16 = | | | | | −3.3029E+00 | 1.7134E−02 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.09 | ImgH/BL | 3.15 |
| Fno | 1.98 | ImgH/f | 1.66 |
| HFOV [deg.] | 60.0 | SD11/ImgH | 0.82 |
| (V4 + V6)/V5 | 0.73 | (R7 + R8)/(R7 − R8) | 1.90 |
| CT1/CT2 | 1.46 | (R9 + R10)/(R9 − R10) | 0.85 |
| T12/T23 | 4.02 | |(R11 + R12)/(R11 − R12)| | 0.04 |
| (T12 + T56)/(T23 + T34 + T45) | 3.16 | f1/f6 | 1.10 |
| CT5/T56 | 2.04 | f3/f5 | 1.32 |

7th Embodiment

Figure 13:
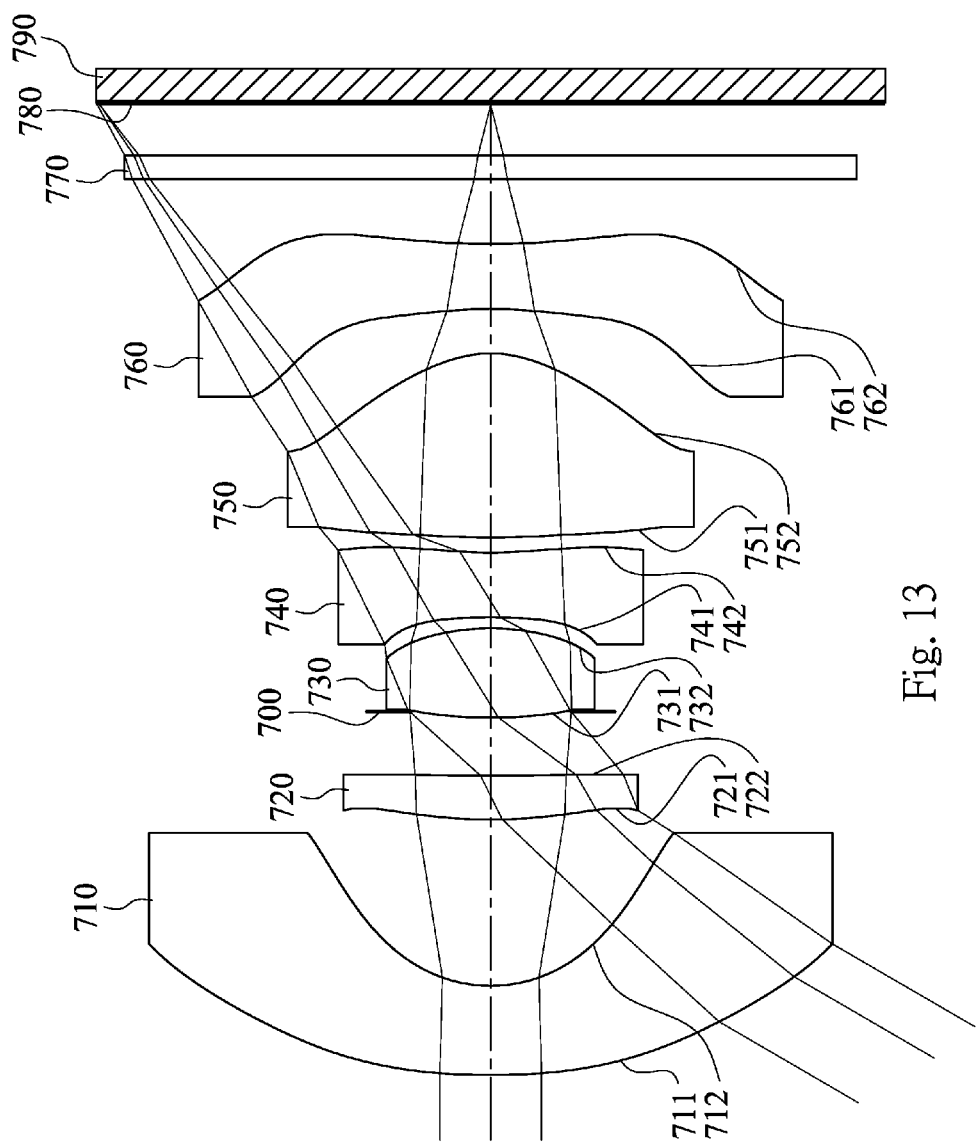
FIG. 13 is a schematic view of an image capturing device according to the 7th embodiment of the present disclosure.
Figure 14:
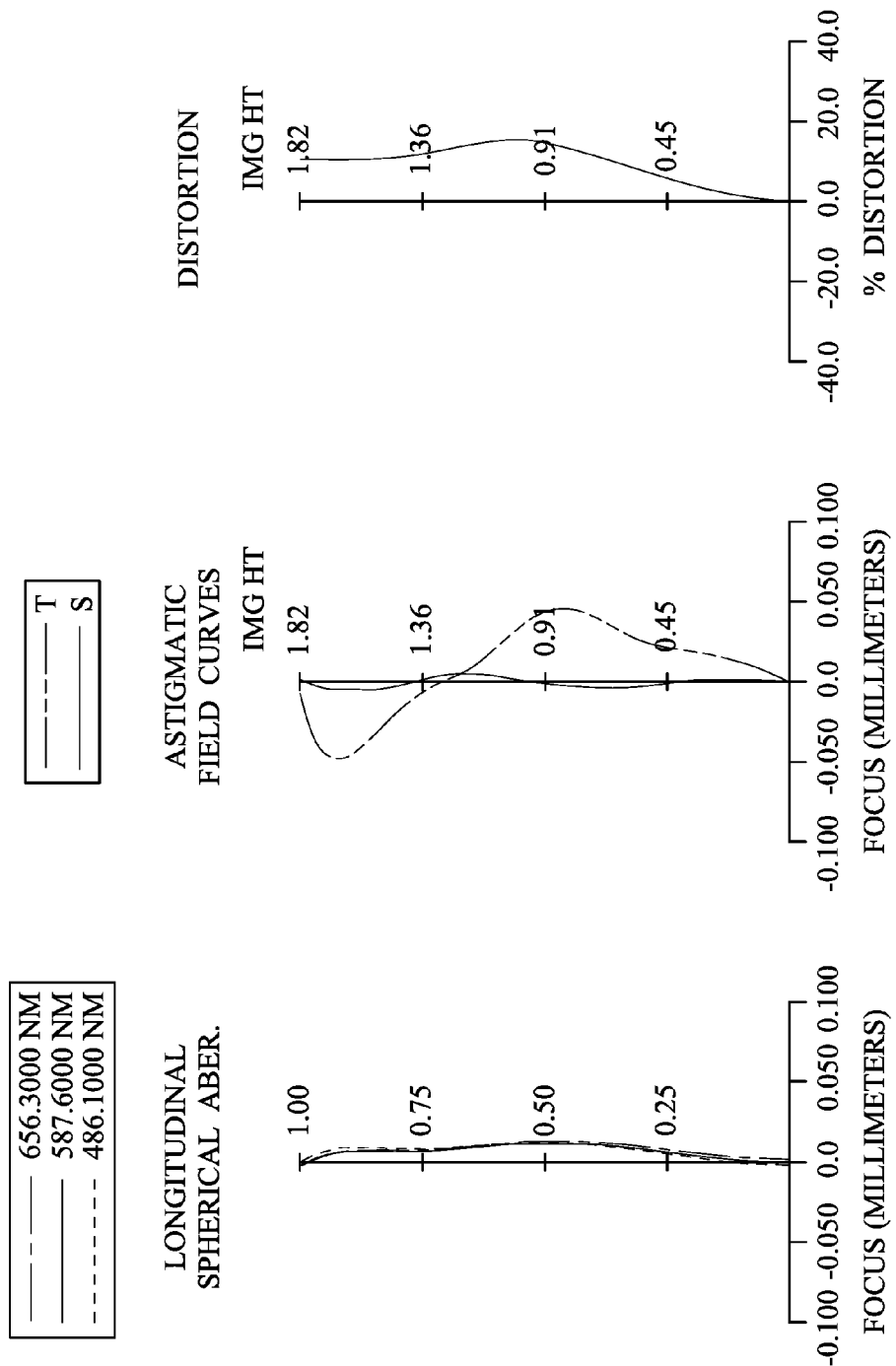
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an optical image lens assembly (its reference numeral is omitted) and an image sensor 790. The optical image lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the image sensor 790 is disposed on the image surface 780 of the optical image lens assembly. The optical image lens assembly has a total of six lens elements (710-760), and there is an air space between every two lens elements of the first lens element 710, the second lens element 720, the third lens element 730, the fourth lens element 740, the fifth lens element 750 and the sixth lens element 760 that are adjacent to each other.

The first lens element 710 with negative refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric. Furthermore, the image-side surface 742 of the fourth lens element 740 includes at least one convex shape in an off-axial region thereof.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being concave in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof.

The IR-cut filter 770 is made of a glass material and located between the sixth lens element 760 and the image surface 780, and will not affect the focal length of the optical image lens assembly.

The detailed optical data of the 7th embodiment are shown in Table 13 and the aspheric surface data are shown in Table 14 below.

TABLE 13

7th Embodiment
f = 0.95 mm, Fno = 2.03, HFOV = 59.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.443 | ASP | 0.413 | Plastic | 1.544 | 55.9 | −1.60 |
| 2 | | 0.666 | ASP | 0.769 | | | | |
| 3 | Lens 2 | 2.319 | ASP | 0.204 | Plastic | 1.660 | 20.4 | 3.44 |
| 4 | | −100.000 | ASP | 0.295 | | | | |
| 5 | Ape. Stop | Plano | | −0.027 | | | | |
| 6 | Lens 3 | 2.523 | ASP | 0.413 | Plastic | 1.544 | 55.9 | 1.52 |
| 7 | | −1.154 | ASP | 0.050 | | | | |
| 8 | Lens 4 | −3.918 | ASP | 0.300 | Plastic | 1.660 | 20.4 | −1.91 |
| 9 | | 1.912 | ASP | 0.070 | | | | |
| 10 | Lens 5 | 3.474 | ASP | 0.852 | Plastic | 1.544 | 55.9 | 0.92 |
| 11 | | −0.537 | ASP | 0.207 | | | | |
| 12 | Lens 6 | −1.596 | ASP | 0.300 | Plastic | 1.660 | 20.4 | −1.75 |
| 13 | | 4.452 | ASP | 0.300 | | | | |
| 14 | IR-cut filter | Plano | | 0.110 | Glass | 1.517 | 64.2 | — |
| 15 | | Plano | | 0.245 | | | | |
| 16 | Image | Plano | | — | | | | |

Reference wavelength is 587.6 nm (d-line).

TABLE 14

Aspheric Coefficients

| | Surface # | | | | |
|---|---|---|---|---|---|
| 1 | 2 | 3 | 4 | 6 | 7 |
| k = 1.2942E+00 | −6.0843E−01 | −4.6873E+01 | −9.0000E+01 | −3.7089E+01 | −2.1189E+00 |
| A4 = 1.3761E−01 | 2.4635E−01 | 3.4403E−01 | 2.4164E−01 | 6.5319E−01 | −6.1044E−01 |
| A6 = −9.5727E−02 | 4.6703E−01 | −9.5824E−01 | −8.9252E−01 | 7.5292E−01 | 3.4205E+00 |
| A8 = 2.6050E−02 | −1.2966E+00 | 1.0891E+00 | 4.2605E+00 | −1.3565E+01 | −2.2225E+01 |
| A10 = −2.0058E−03 | 1.4574E+00 | −4.8086E+00 | −1.5673E+01 | 2.7959E+01 | 2.5352E+01 |
| A12 = | −1.4342E+00 | 5.5399E+00 | 1.8666E+01 | −2.5845E+01 | −4.8106E+01 |

TABLE 14-continued

Aspheric Coefficients

| Surface # | | | | | |
|---|---|---|---|---|---|
| 8 | 9 | 10 | 11 | 12 | 13 |
| k = -9.0000E+01 | -1.6342E+01 | -3.6042E+01 | -2.0479E+00 | -5.9773E-01 | -5.8693E+01 |
| A4 = -1.7014E+00 | -7.6937E-01 | -2.5372E-01 | 4.8649E-01 | 1.3878E+00 | 2.4037E-01 |
| A6 = 5.5995E+00 | 2.3228E+00 | 4.5613E-01 | -2.2941E+00 | -4.9442E+00 | -7.5655E-01 |
| A8 = -3.1610E+01 | -7.9765E+00 | -1.0092E+00 | 5.1226E+00 | 9.7412E+00 | 8.0229E-01 |
| A10 = 7.4829E+01 | 2.1074E+01 | 3.9217E+00 | -7.2712E+00 | -1.3563E+01 | -6.1323E-01 |
| A12 = -2.5368E+02 | -3.1041E+01 | -5.8547E+00 | 6.5641E+00 | 1.1641E+01 | 2.9591E-01 |
| A14 = 3.2070E+02 | 1.8348E+01 | 2.6245E+00 | -2.4767E+00 | -5.1857E+00 | -6.8202E-02 |
| A16 = | | | | 9.0872E-01 | 4.8647E-03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.95 | ImgH/BL | 2.77 |
| Fno | 2.03 | ImgH/f | 1.91 |
| HFOV [deg.] | 59.8 | SD11/ImgH | 0.87 |
| (V4 + V6)/V5 | 0.73 | (R7 + R8)/(R7 − R8) | 0.34 |
| CT1/CT2 | 2.02 | (R9 + R10)/(R9 − R10) | 0.73 |
| T12/T23 | 2.87 | \|(R11 + R12)/(R11 − R12)\| | 0.47 |
| (T12 + T56)/(T23 + T34 + T45) | 2.52 | f1/f6 | 0.91 |
| CT5/T56 | 4.12 | f3/f5 | 1.65 |

8th Embodiment

Figure 16:
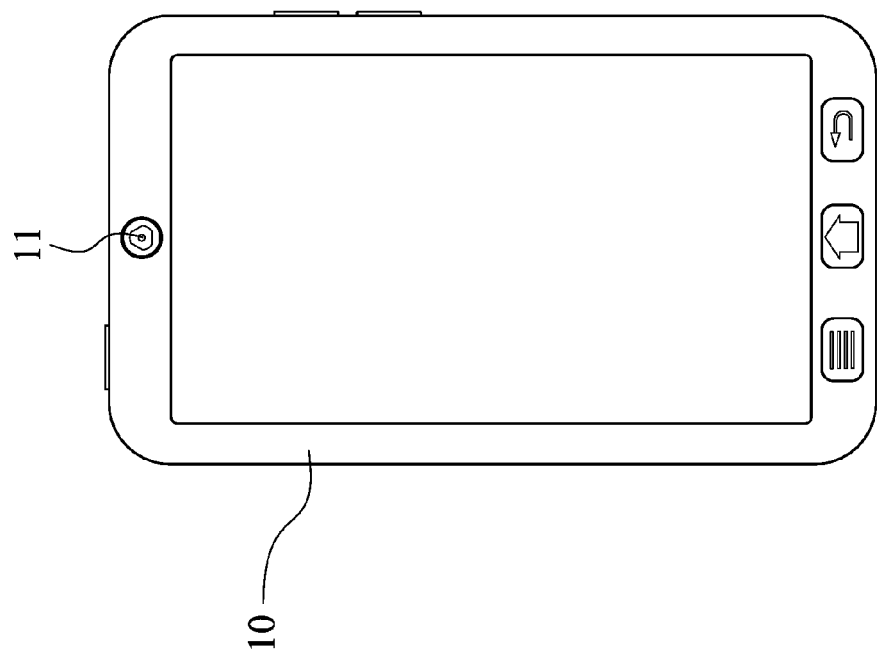
FIG. 16 is a schematic view of an electronic device according to the 8th embodiment of the present disclosure.

FIG. 16 is a schematic view of an electronic device 10 according to the 8th embodiment of the present disclosure. The electronic device 10 of the 8th embodiment is a smartphone, wherein the electronic device 10 includes an image capturing device 11. The image capturing device 11 includes an optical image lens assembly (its reference numeral is omitted) according to the present disclosure and an image sensor (its reference numeral is omitted), wherein the image sensor is disposed on an image surface of the optical image lens assembly.

9th Embodiment

Figure 17:
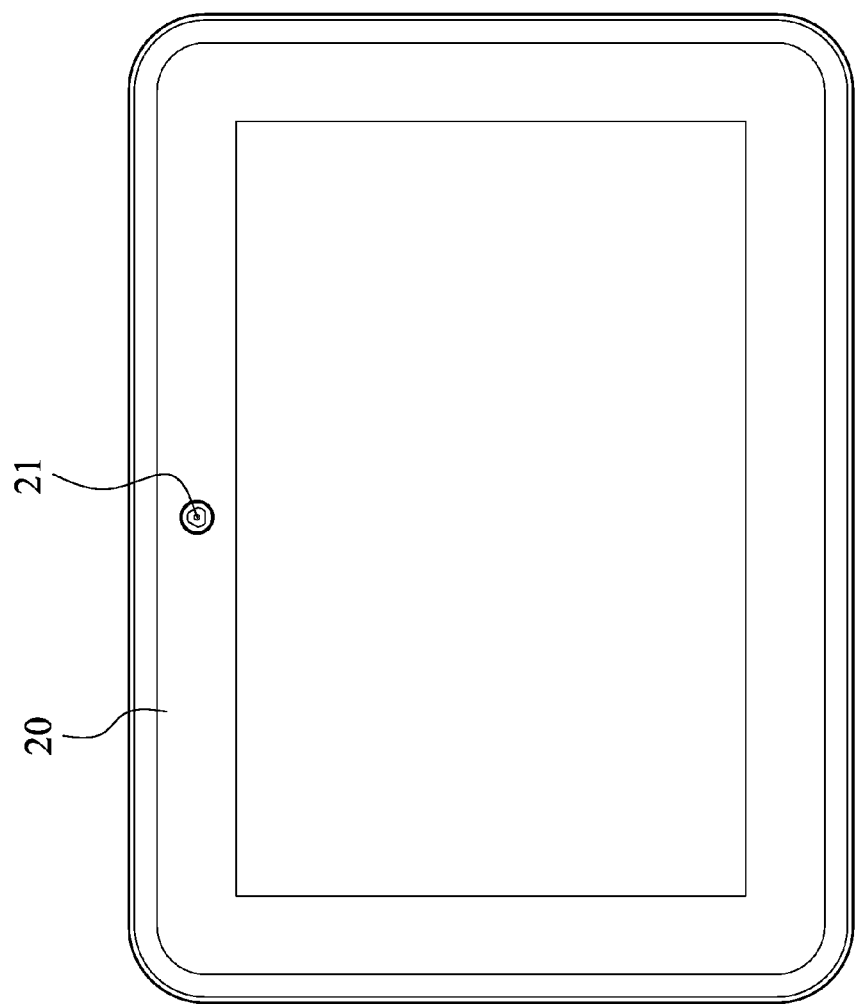
FIG. 17 is a schematic view of an electronic device according to the 9th embodiment of the present disclosure.

FIG. 17 is a schematic view of an electronic device 20 according to the 9th embodiment of the present disclosure. The electronic device 20 of the 9th embodiment is a tablet personal computer, wherein the electronic device 20 includes an image capturing device 21. The image capturing device 21 includes an optical image lens assembly (its reference numeral is omitted) according to the present disclosure and an image sensor (its reference numeral is omitted), wherein the image sensor is disposed on an image surface of the optical image lens assembly.

10th Embodiment

Figure 18:
FIG. 18 is a schematic view of an electronic device according to the 10th embodiment of the present disclosure.

FIG. 18 is a schematic view of an electronic device 30 according to the 10th embodiment of the present disclosure. The electronic device 30 of the 10th embodiment is a wearable device, wherein the electronic device 30 includes an image capturing device 31. The image capturing device 31 includes an optical image lens assembly (its reference numeral is omitted) according to the present disclosure and an image sensor (its reference numeral is omitted), wherein the image sensor is disposed on an image surface of the optical image lens assembly.

The foregoing description, for purpose of explanation, has been described with reference to specific embodiments. It is to be noted that Tables 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly comprising, in order from an object side to an image side:
    a first lens element with negative refractive power having an image-side surface being concave in a paraxial region thereof;
    a second lens element having an object-side surface being convex in a paraxial region thereof and an image-side surface being concave in a paraxial region thereof;
    a third lens element having positive refractive power;
    a fourth lens element with negative refractive power having an image-side surface being concave in a paraxial region thereof;
    a fifth lens element with positive refractive power having an image-side surface being convex in a paraxial region thereof; and
    a sixth lens element with negative refractive power having an object-side surface being concave in a paraxial region thereof and an image-side surface being concave in a paraxial region thereof, wherein the object-side surface and the image-side surface of the sixth lens element are aspheric, and the image-side surface of the sixth lens element comprises at least one convex shape in an off-axial region thereof;
    wherein the optical image lens assembly has a total of six lens elements, there is an air space between every two lens elements of the first lens element, the second lens element, the third lens element, the fourth lens element, the fifth lens element and the sixth lens element that are adjacent to each other, an axial distance between the first lens element and the second lens element is T12, an axial distance between the second lens element and the third lens element is T23, a curvature radius of the object-side surface of the sixth lens element is R11, a curvature radius of the image-side surface of the sixth lens element is R12, and the following conditions are satisfied:

$1.0 < T12/T23 < 15$; and $|(R11+R12)/(R11-R12)| < 0.90$.

2. The optical image lens assembly of claim 1, wherein a central thickness of the fifth lens element is CT5, an axial distance between the fifth lens element and the sixth lens element is T56, and the following condition is satisfied:

$0 < CT5/T56 < 7.50$.

3. The optical image lens assembly of claim 2, wherein the central thickness of the fifth lens element is CT5, the axial distance between the fifth lens element and the sixth lens element is T56, and the following condition is satisfied:

$0.70 < CT5/T56 < 3.75$.

4. The optical image lens assembly of claim 1, wherein a maximum image height of the optical image lens assembly is ImgH, an axial distance between the image-side surface of the sixth lens element and an image surface is BL, and the following condition is satisfied:

$2.40 < ImgH/BL < 4.50$.

5. The optical image lens assembly of claim 4, wherein a curvature radius of an object-side surface of the fifth lens element is R9, a curvature radius of the image-side surface of the fifth lens element is R10, and the following condition is satisfied:

$0 < (R9+R10)/(R9-R10) < 10$.

6. The optical image lens assembly of claim 1, further comprising:
an aperture stop disposed between an imaged object and the third lens element, wherein a maximum effective radius of an object-side surface of the first lens element is SD11, a maximum image height of the optical image lens assembly is ImgH, and the following condition is satisfied:

$0.50 < SD11/ImgH < 1.25$.

7. The optical image lens assembly of claim 1, wherein the axial distance between the first lens element and the second lens element is T12, the axial distance between the second lens element and the third lens element is T23, and the following condition is satisfied:

$1.50 < T12/T23 < 7.50$.

8. The optical image lens assembly of claim 1, wherein an object-side surface and the image-side surface of the fourth lens element are aspheric, and the image-side surface of the fourth lens element comprises at least one convex shape in an off-axial region thereof.

9. The optical image lens assembly of claim 1, wherein a central thickness of the first lens element is CT1, a central thickness of the second lens element is CT2, and the following condition is satisfied:

$0.75 < CT1/CT2 < 5.0$.

10. The optical image lens assembly of claim 9, wherein an Abbe number of the fourth lens element is V4, an Abbe number of the fifth lens element is V5, an Abbe number of the sixth lens element is V6, and the following condition is satisfied:

$0.50 < (V4+V6)/V5 < 1.20$.

11. The optical image lens assembly of claim 1, wherein the curvature radius of the object-side surface of the sixth lens element is R11, the curvature radius of the image-side surface of the sixth lens element is R12, and the following condition is satisfied:

$|(R11+R12)/(R11-R12)| < 0.60$.

12. The optical image lens assembly of claim 1, wherein the axial distance between the first lens element and the second lens element is T12, the axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$1.0 < (T12+T56)/(T23+T34+T45) < 4.50$.

13. The optical image lens assembly of claim 1, wherein a maximum image height of the optical image lens assembly is ImgH, a focal length of the optical image lens assembly is f, and the following condition is satisfied:

$1.30 < ImgH/f < 3.0$.

14. The optical image lens assembly of claim 1, wherein a focal length of the third lens element is f3, a focal length of the fifth lens element is f5, and the following condition is satisfied:

$0.75 < f3/f5 < 1.5$.

15. An image capturing device, comprising:
the optical image lens assembly of claim 1; and
an image sensor, wherein the image sensor is disposed on an image surface of the optical image lens assembly.

16. An electronic device, comprising:
the image capturing device of claim 15.

17. An optical image lens assembly comprising, in order from an object side to an image side:
a first lens element with negative refractive power having an image-side surface being concave in a paraxial region thereof;
a second lens element having an object-side surface being convex in a paraxial region thereof and an image-side surface being concave in a paraxial region thereof;
a third lens element having positive refractive power;
a fourth lens element with negative refractive power having an image-side surface being concave in a paraxial region thereof;
a fifth lens element with positive refractive power having an image-side surface being convex in a paraxial region thereof; and
a sixth lens element with negative refractive power having an object-side surface being concave in a paraxial region thereof and an image-side surface being concave in a paraxial region thereof, wherein the object-side surface and the image-side surface of the sixth lens element are aspheric, and the image-side surface of the sixth lens element comprises at least one convex shape in an off-axial region thereof;
wherein the optical image lens assembly has a total of six lens elements, there is an air space between every two lens elements of the first lens element, the second lens element, the third lens element, the fourth lens element, the fifth lens element and the sixth lens element that are adjacent to each other, an axial distance between the first lens element and the second lens element is T12, an axial distance between the second lens element and the third lens element is T23, a curvature radius of the object-side surface of the sixth lens element is R11, a curvature radius of the image-side surface of the sixth lens element is R12, and the following conditions are satisfied:

$0 < T12/T23 < 15$; and $|(R11+R12)/(R11-R12)| < 0.80$.

18. The optical image lens assembly of claim 17, wherein a central thickness of the first lens element is CT1, a central thickness of the second lens element is CT2, and the following condition is satisfied:

$0.75 < CT1/CT2 < 5.0$.

19. The optical image lens assembly of claim 17, wherein an object-side surface and the image-side surface of the fourth lens element are aspheric, a curvature radius of the object-side surface of the fourth lens element is R7, a curvature radius of the image-side surface of the fourth lens element is R8, and the following condition is satisfied:

$0 < (R7+R8)/(R7-R8) < 5.5$.

20. The optical image lens assembly of claim 17, wherein a maximum image height of the optical image lens assembly is ImgH, an axial distance between the image-side surface of the sixth lens element and an image surface is BL, and the following condition is satisfied:

$2.40 < ImgH/BL < 4.50$.

21. The optical image lens assembly of claim 17, wherein a focal length of the third lens element is f3, a focal length of the fifth lens element is f5, and the following condition is satisfied:

$0.75 < f3/f5 < 1.5$.

22. The optical image lens assembly of claim 17, wherein a focal length of the first lens element is f1, a focal length of the sixth lens element is f6, and the following condition is satisfied:

$0.40 < f1/f6 < 1.25$.

23. The optical image lens assembly of claim 17, wherein a central thickness of the fifth lens element is CT5, an axial distance between the fifth lens element and the sixth lens element is T56, and the following condition is satisfied:

$0.50 < CT5/T56 < 3.75$.

24. The optical image lens assembly of claim 17, wherein a maximum effective radius of an object-side surface of the first lens element is SD11, a maximum image height of the optical image lens assembly is ImgH, and the following condition is satisfied:

$0.50 < SD11/ImgH < 1.25$.

* * * * *